US 12,302,457 B2

(12) United States Patent
Selvanesan et al.

(10) Patent No.: US 12,302,457 B2
(45) Date of Patent: May 13, 2025

(54) ADVANCED FEEDBACK IN SIDELINK

(71) Applicant: KONINKLIJKE PHILIPS N.V., Eindhoven (NL)

(72) Inventors: Sarun Selvanesan, Berlin (DE); Thomas Fehrenbach, Berlin (DE); Roya Ebrahim Rezagah, Berlin (DE); Cornelius Hellge, Berlin (DE); Thomas Wirth, Berlin (DE); Thomas Schierl, Berlin (DE); Robin Thomas, Berlin (DE); Baris Goktepe, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/597,987

(22) Filed: Mar. 7, 2024

(65) Prior Publication Data

US 2024/0215112 A1    Jun. 27, 2024

Related U.S. Application Data

(63) Continuation of application No. 17/370,647, filed on Jul. 8, 2021, now Pat. No. 11,950,326, which is a
(Continued)

(30) Foreign Application Priority Data

Jan. 10, 2019  (EP) .................................... 19151273

(51) Int. Cl.
*H04W 92/18* (2009.01)
*H04L 1/1829* (2023.01)
(52) U.S. Cl.
CPC ........... *H04W 92/18* (2013.01); *H04L 1/1854* (2013.01)

(58) Field of Classification Search
CPC ............. H04W 92/18; H04W 72/0446; H04W 72/232; H04W 72/25; H04L 1/1854;
(Continued)

(56) References Cited

U.S. PATENT DOCUMENTS 10,187,878 B2   1/2019   Lin et al.
10,506,402 B2  12/2019   Rajagopal et al.
(Continued)

FOREIGN PATENT DOCUMENTS

CN   102904698 A    1/2013
EP     3079382 A1  10/2016
(Continued)

OTHER PUBLICATIONS

LG Electronics,3GPP TSG RAN WG1 Meeting #95, R1-1814265, Updated feature lead summary for agenda item 7.2.4.1.2 Physical layer procedures, Nov. 12-16, 2018 (Year: 2018).*
(Continued)

*Primary Examiner* — Farid Seyedvosoghi

(57) ABSTRACT

A wireless communication system includes one or more base stations, and a plurality of UEs for a sidelink communication using sidelink resources. The UEs includes a transmitting UE and a receiving UE using a subset of the sidelink resources of the wireless communication system. The receiving UE sends over the sidelink a sidelink feedback to the transmitting UE. The sidelink feedback indicates for a data transmission a successful or non-successful reception at the receiving UE. The transmitting UE reports the sidelink feedback to a base station. The base station provides to the transmitting UE, responsive to the sidelink feedback, sidelink resources for a possible retransmission of a data packet over the sidelink to the receiving UE. The reporting of the
(Continued)

sidelink feedback to the base station by the transmitting UE is activated or deactivated responsive to one or more conditions.

19 Claims, 16 Drawing Sheets

Related U.S. Application Data continuation of application No. PCT/EP2020/050398, filed on Jan. 9, 2020.

(58) Field of Classification Search
CPC ... H04L 1/1607; H04L 1/1825; H04L 1/1896; H04L 1/1861; H04L 1/1621; H04L 1/1812; H04L 5/0055
See application file for complete search history.

(56) References Cited

U.S. PATENT DOCUMENTS

| | | | |
|---|---|---|---|
| 2011/0275382 A1 | 11/2011 | Hakola | |
| 2015/0296490 A1 | 10/2015 | Yi et al. | |
| 2020/0059821 A1* | 2/2020 | Wirth | H04W 28/0268 |
| 2021/0321380 A1 | 10/2021 | Zhao | |
| 2023/0040458 A1* | 2/2023 | Ji | H04W 52/0212 |

FOREIGN PATENT DOCUMENTS

| | | | |
|---|---|---|---|
| KR | 102509359 B1 * | 8/2018 | |
| WO | 2011106931 A1 | 9/2011 | |

OTHER PUBLICATIONS

3GPP TR 38.885 V16.0.0, "Technical Specification Group Radio Access Network; NR; Study on NR Vehicle-to-1 f=verything", (V2X), Release 16, US-Anm.txt: "Rel. 16 V2X Study Item", Mar. 2019.

LG Electronics "Updated Feature Lead Summary for Agenda Item 7.2.4.1.2 Physical Layer Procedures" 3GPP Draft R1-1814265 Nov. 1-16, 2018 pp. 1-12.

LG Electronics et al "Revised WI Proposal: LTE-Based V2X Services" 3GPP TSG RAN Meeting #73 RP-161894 New Orleans, Sep. 12-22, 2016.

Dppo, "Physical layer procedure for NR-V2X", 3GPP TSG RAN WG1 Meeting #95 R1-1812811, [online], Nov. 3, 2018.

3rd Generation Partnership Project: Technical Specification Group Radio Access Network: Evolved Universal Terrestrial Radio Access Physical Layer Procedures (Release 15) 3GPP TS 36.213 V 15.3.0 (Sep. 2018) Oct. 1, 2018 p. 474,476, 482-484, 491.

Qualcomm Incorporated "Physical Layer Procedures for Harq Operation for Groupcast and Unicast Transmissions" 3GPP TSG AN WG1 Meeting #95 R1-1813422 Nov. 3, 2018.

Kawamoto, Junichiro, two others, "A Study of Erasure Code to Improve Burst Loss Tolerance," ITE Technical Report, Japan, The Institute of Image Information and Television Engineers, Jul. 21, 2016, vol. 40, No. 23, pp. 5 to 8.

Sony, "Discussion on Physical Layer Structure for NR sidelink", 3GPP TSG RAN WG1 Meeting #95 R1-1813140, online], Nov. 3, 2018.

Fraunhofer HHI, Fraunhofer IIS, "Analysis and Design of V2X Resource Entities", 3GPP TSG RAN WG1 Meeting #95 R1-1812400, [online]. Nov. 2, 2018.

* cited by examiner

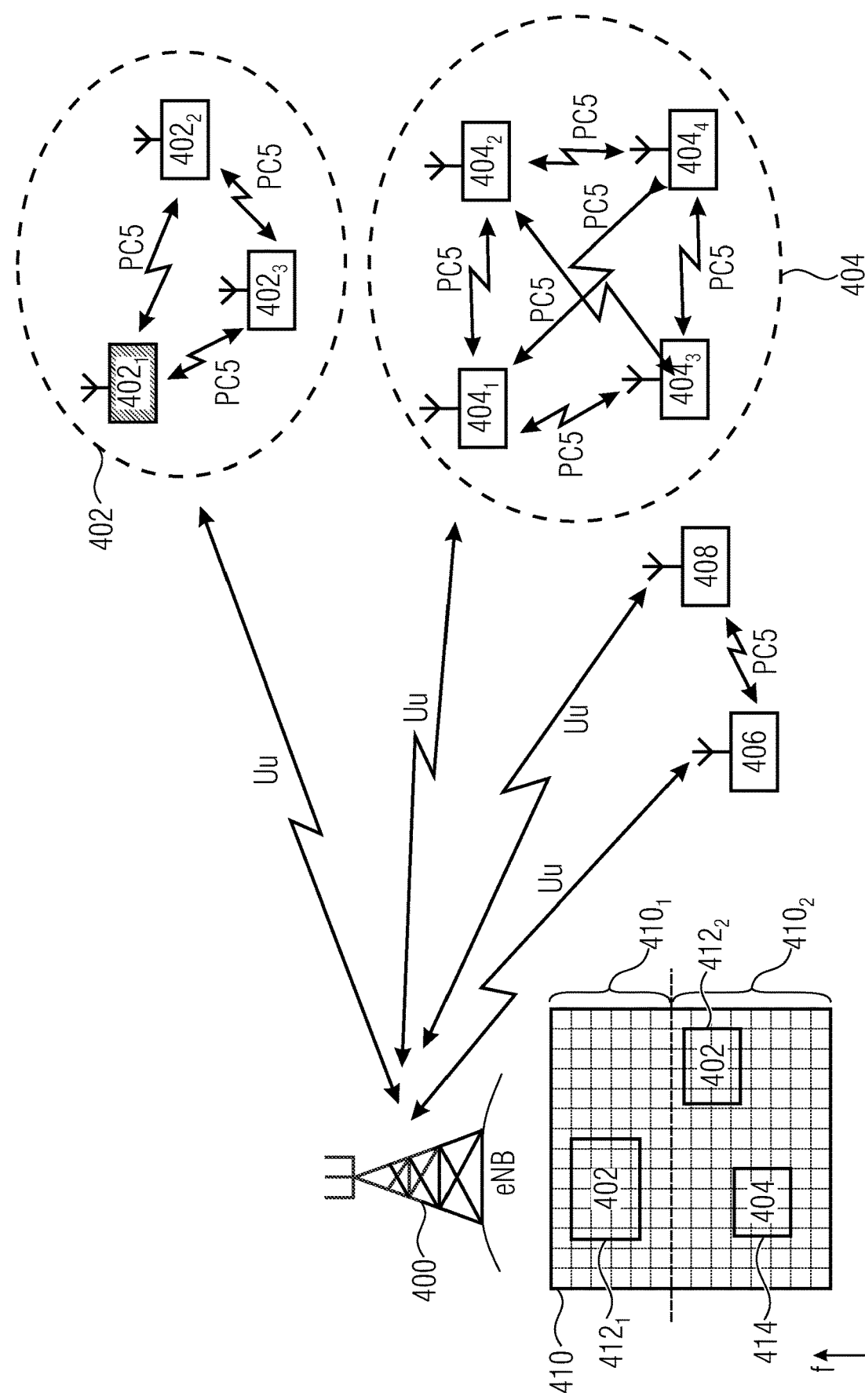

ADVANCED FEEDBACK IN SIDELINK

CROSS-REFERENCES TO RELATED APPLICATIONS

This application is a continuation of the U.S. application Ser. No. 17/370,647 filed on Jul. 8, 2021 which is a continuation of International Application No. PCT/EP2020/050398, filed on Sep. 1, 2020, which claims the benefit of EP Patent Application No. EP 19151273.0, filed on Oct. 1, 2019. These applications are hereby incorporated by reference herein.

The present application relates to the field of wireless communication systems or networks, more specifically to approaches for a wireless communication among user devices of a wireless communication system using a sidelink communication, like a V2X communication. Embodiments concern improvements in the communication over the sidelink as well as improvements in the handling of feedback in the sidelink, like an advanced HARQ feedback.

BACKGROUND OF THE INVENTION

FIG. 1 is a schematic representation of an example of a terrestrial wireless network 100 including, as is shown in FIG. 1(a), a core network 102 and one or more radio access networks $RAN_1$, $RAN_2$, . . . $RAN_N$. FIG. 1(b) is a schematic representation of an example of a radio access network $RAN_n$ that may include one or more base stations $gNB_1$ to $gNB_5$, each serving a specific area surrounding the base station schematically represented by respective cells $106_1$ to $106_5$. The base stations are provided to serve users within a cell. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the $RAN_n$ may include more or less such cells, and $RAN_n$ may also include only one base station. FIG. 1(b) shows two users $UE_1$ and $UE_2$, also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base station $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. Further, some or all of the respective base station $gNB_1$ to $gNB_5$ may be connected, e.g. via the S1 or X2 interface or the XN interface in NR, with each other via respective backhaul links $116_1$ to $116_5$, which are schematically represented in FIG. 1(b) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSSCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard or the 5G or NR, New Radio, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink (SL) channels, e.g., using the PC5 interface. UEs that communicate directly with each other over the sidelink may include vehicles communicating directly with other vehicles (V2V communication), vehicles communicating with other entities of the wireless communication network (V2X communication), for example roadside entities, like traffic lights, traffic signs, or pedestrians. Other UEs may not be vehicular related UEs and may comprise any of the above-mentioned devices. Such devices may also communicate directly with each other (D2D communication) using the SL channels.

When considering two UEs directly communicating with each other over the sidelink, both UEs may be served by the same base station so that the base station may provide sidelink resource allocation configuration or assistance for the UEs. For example, both UEs may be within the coverage area of a base station, like one of the base stations depicted in FIG. 1. This is referred to as an "in-coverage" scenario. Another scenario is referred to as an "out-of-coverage" scenario. It is noted that "out-of-coverage" does not mean that the two UEs are not within one of the cells depicted in FIG. 1, rather, it means that these UEs

- may not be connected to a base station, for example, they are not in an RRC connected state, so that the UEs do not receive from the base station any sidelink resource allocation configuration or assistance, and/or
- may be connected to the base station, but, for one or more reasons, the base station may not provide sidelink resource allocation configuration or assistance for the UEs, and/or
- may be connected to the base station that may not support NR V2X services, e.g. GSM, UMTS, LTE base stations.

When considering two UEs directly communicating with each other over the sidelink, e.g. using the PC5 interface, one of the UEs may also be connected with a BS, and may relay information from the BS to the other UE via the sidelink interface. The relaying may be performed in the same frequency band (in-band-relay) or another frequency band (out-of-band relay) may be used. In the first case, communication on the Uu and on the sidelink may be decoupled using different time slots as in time division duplex, TDD, systems.

FIG. 2 is a schematic representation of an in-coverage scenario in which two UEs directly communicating with each other are both connected to a base station. The base station gNB has a coverage area that is schematically represented by the circle 200 which, basically, corresponds to the cell schematically represented in FIG. 1. The UEs directly communicating with each other include a first vehicle 202 and a second vehicle 204 both in the coverage area 200 of the base station gNB. Both vehicles 202, 204 are connected to the base station gNB and, in addition, they are connected directly with each other over the PC5 interface. The scheduling and/or interference management of the V2V traffic is assisted by the gNB via control signaling over the Uu interface, which is the radio interface between the base station and the UEs. In other words, the gNB provides SL resource allocation configuration or assistance for the UEs, and the gNB assigns the resources to be used for the V2V communication over the sidelink. This configuration is also referred to as a mode 1 configuration in NR V2X or as a mode 3 configuration in LTE V2X.

FIG. 3 is a schematic representation of an out-of-coverage scenario in which the UEs directly communicating with each other are either not connected to a base station, although they may be physically within a cell of a wireless communication network, or some or all of the UEs directly communicating with each other are to a base station but the base station does not provide for the SL resource allocation configuration or assistance. Three vehicles 206, 208 and 210 are shown directly communicating with each other over a sidelink, e.g., using the PC5 interface. The scheduling and/or interference management of the V2V traffic is based on algorithms implemented between the vehicles. This configuration is also referred to as a mode 2 configuration in NR V2X or as a mode 4 configuration in LTE V2X. As mentioned above, the scenario in FIG. 3 which is the out-of-coverage scenario does not necessarily mean that the respective mode 4 UEs are outside of the coverage 200 of a base station, rather, it means that the respective mode 4 UEs are not served by a base station, are not connected to the base station of the coverage area, or are connected to the base station but receive no SL resource allocation configuration or assistance from the base station. Thus, there may be situations in which, within the coverage area 200 shown in FIG. 2, in addition to the mode 3 UEs 202, 204 also mode 4 UEs 206, 208, 210 are present.

In the above-described scenarios of vehicular user devices, UEs, a plurality of such user devices may form a user device group, also referred to simply as group, and the communication within the group or among the group members may be performed via the sidelink interfaces between the user devices, like the PC5 interface. For example, the above-described scenarios using vehicular user devices may be employed in the field of the transport industry in which a plurality of vehicles being equipped with vehicular user devices may be grouped together, for example, by a remote driving application. Other use cases in which a plurality of user devices may be grouped together for a sidelink communication among each other include, for example, factory automation and electrical power distribution. In the case of factory automation, a plurality of mobile or stationary machines within a factory may be equipped with user devices and grouped together for a sidelink communication, for example for controlling the operation of the machine, like a motion control of a robot. In the case of electrical power distribution, entities within the power distribution grid may be equipped with respective user devices which, within a certain area of the system may be grouped together so as to communicate via a sidelink communication with each other so as to allow for monitoring the system and for dealing with power distribution grid failures and outages.

Naturally, in the above mentioned use cases sidelink communication is not limited to a communication within a group. Rather, the sidelink communication may be among any of UEs, like any pair of UEs.

It is noted that the information in the above section is only for enhancing the understanding of the background of the invention and therefore it may contain information that does not form known technology that is already known to a person of ordinary skill in the art.

Starting from known technology as described above, there may be a need for improvements in the communication over the sidelink and improvements in the handling of feedback in the sidelink.

SUMMARY

According to an embodiment, a wireless communication system may have: one or more base stations, and a plurality of user devices, UEs, configured for a sidelink communication using resources from a set of sidelink resources of the wireless communication system, wherein the plurality of UEs includes at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmission a successful or non-successful reception at the receiving UE, and the transmitting UE configured to report the sidelink feedback to a base station, wherein the base station is configured to provide to the transmitting UE, responsive to the sidelink feedback, sidelink resources for a possible retransmission of a data packet over the sidelink to the receiving UE, and wherein reporting the sidelink feedback to the base station by the transmitting UE is activated or deactivated responsive to one or more conditions.

According to another embodiment, a wireless communication system may have: one or more base stations, and a plurality of user devices, UEs, configured for a sidelink communication using resources from a set of sidelink resources of the wireless communication system, wherein the plurality of UEs includes at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE for a plurality of data transmissions, the sidelink feedback indicating for a data transmission a successful or non-successful reception at the receiving UE, and wherein the transmitting UE configured to bundle a plurality of sidelink feedbacks received from the receiving UE for reporting to a base station.

Another embodiment may have a base station for a wireless communication system, the wireless communication system including one or more base stations, and a plurality of user devices, UEs, configured for a sidelink communication using resources from a set of sidelink resources of the wireless communication system, and wherein the plurality of UEs includes at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmissions a successful or non-successful reception at the receiving UE, wherein the base station is to receive from the transmitting UE the sidelink feedback to a base station, wherein the base station is to provide to the transmitting UE, responsive to the sidelink feedback, sidelink resources for a possible retransmission of a data packet over the sidelink to the receiving UE, and wherein reporting the sidelink feedback to the base station by the transmitting UE is activated or deactivated responsive to one or more conditions.

Another embodiment may have a user device, UE, for a wireless communication system, the wireless communication system including one or more base stations, and a plurality of user devices, UEs, configured for a sidelink communication using resources from a set of sidelink resources of the wireless communication system, wherein the UE is to transmit to at least one receiving UE using at least a subset of the sidelink resources of the wireless communication system for the sidelink communication, wherein the UE is to receive from the receiving UE over the sidelink a sidelink feedback, the sidelink feedback indicating for a data transmissions a successful or non-successful reception at the receiving UE, wherein the UE is to report the sidelink feedback to a base station, wherein the UE is to receive from the base station, responsive to reporting the sidelink feedback, sidelink resources for a possible retransmission of a data packet over the sidelink to the receiving UE, and wherein reporting the sidelink feedback to the base station by the transmitting UE is activated or deactivated responsive to one or more conditions.

BRIEF DESCRIPTION OF THE DRAWINGS

Embodiments of the present invention will be detailed subsequently referring to the appended drawings, in which:

FIG. 4 is a schematic representation of a part of the wireless communication network, like the one of FIG. 1, for describing the concept of providing a set of resources to be exclusively used for a groupcast communication;

DETAILED DESCRIPTION OF THE INVENTION

Embodiments of the present invention are now described in more detail with reference to the accompanying drawings in which the same or similar elements have the same reference signs assigned.

The initial vehicle-to-everything (V2X) specification was included in LTE Release 14 of the 3GPP standard. The scheduling and assignment of resources had been modified according to the V2X requirements, while the original device-to-device (D2D) communication standard has been used as a basis of the design. Cellular V2X has been agreed to operate in two configurations from a resource allocation perspective, namely in the above-described mode 3 and mode 4 configurations. As mentioned above, in the V2X mode 3 configuration the scheduling and interference management of resources is performed by the base station for UEs so as to enable sidelink, SL, communications, like vehicle-to-vehicle communications. The control signaling is provided to the UE over the Uu interface, for example using the downlink control indicator, DCI, and is dynamically assigned by the base station. In the V2X mode 4 configuration the scheduling and interference management for SL communications is autonomously performed using distributed or decentralized algorithms among the UEs based on a preconfigured resource configuration.

Figure 1A:
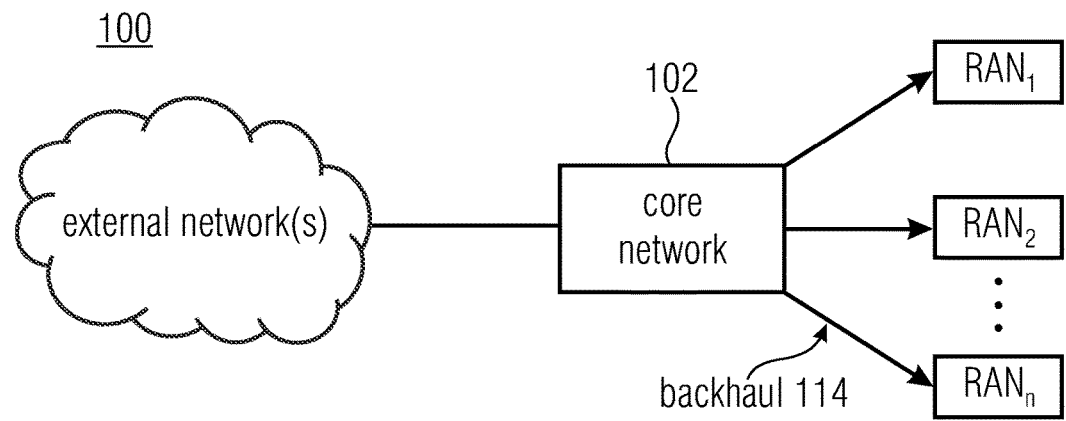
FIG. 1 shows a schematic representation of an example of a wireless communication system.
Figure 1B:
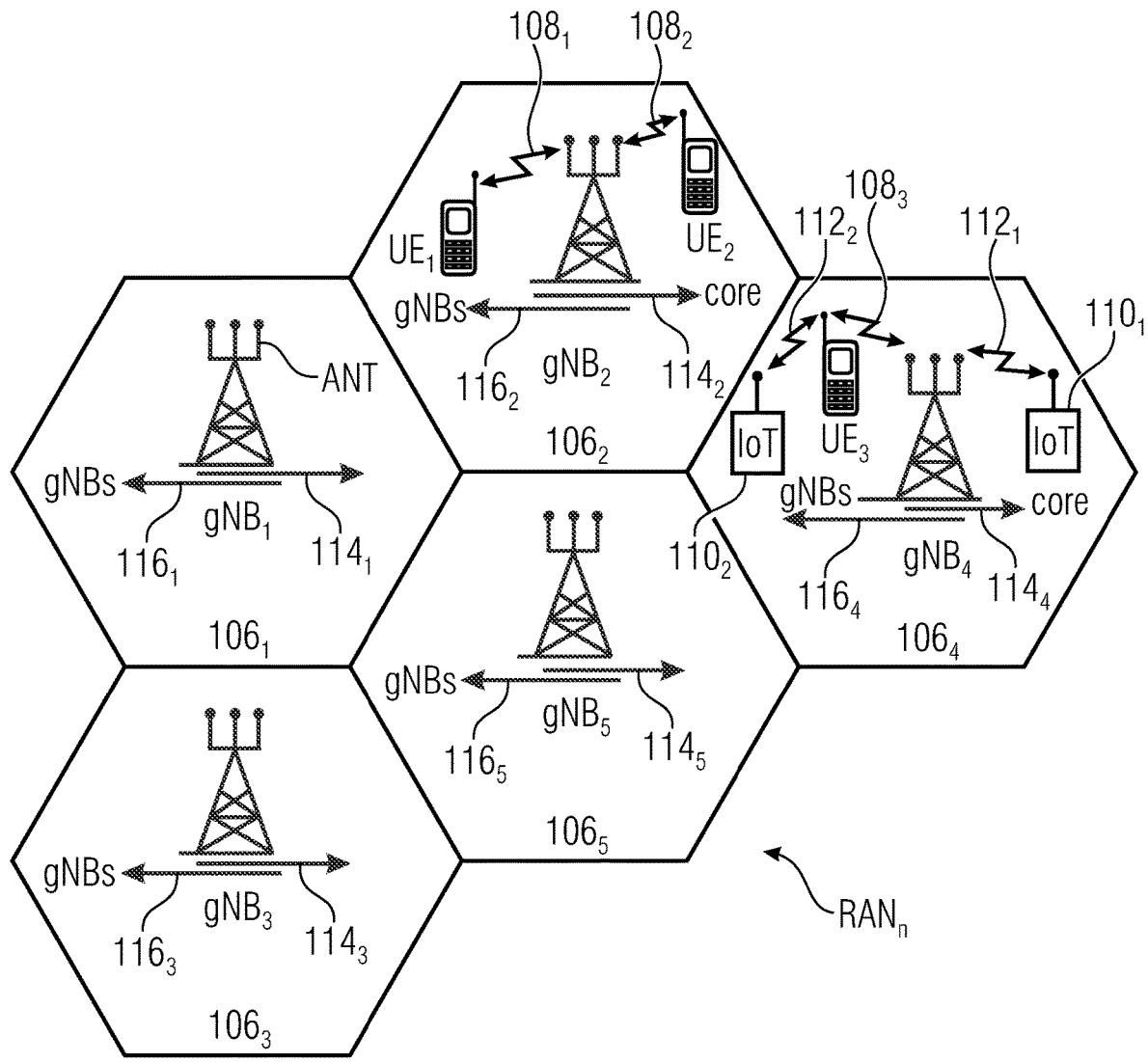
Figure 2:
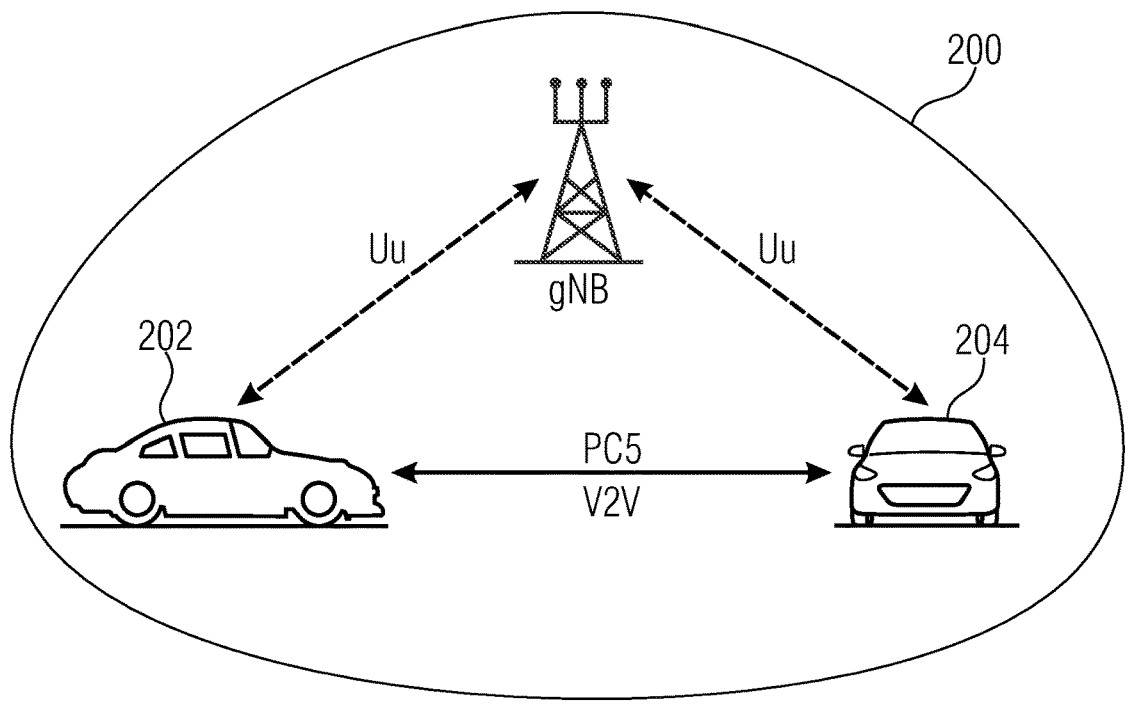
FIG. 2 is a schematic representation of an in-coverage scenario in which UEs directly communicating with each other are connected to a base station.
Figure 3:
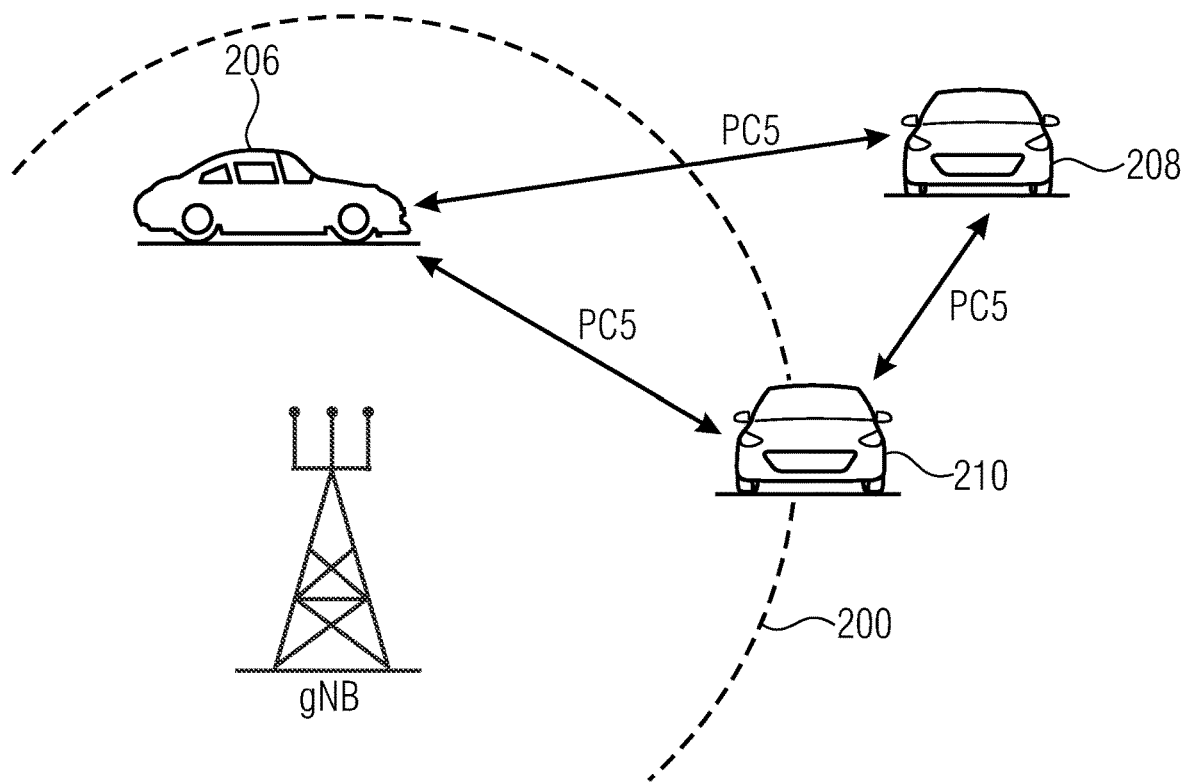
FIG. 3 is a schematic representation of an out-of-coverage scenario in which UEs directly communicating with each other receive no SL resource allocation configuration or assistance from a base station.

FIG. 4 is a schematic representation of a part of the wireless communication network, like the one described with reference to FIG. 1, and illustrates a cell of the network mentioned above or one of a plurality of radio access networks available in such a wireless communication network. FIG. 4 illustrates a base station 400 and a plurality of user devices, UEs. Some of the UEs are grouped into respective user device groups 402 and 404, while other UEs, like UEs 406 and 408 are not members of any group. The first group 402 includes, in accordance with the depicted example, three UEs 4021 to 4023, and within the group 402, the UEs 4021 to 4023 may communicate with each other using a sidelink interface, like the PC5 interface. The group 404 includes four UEs 4041 to 4044 which, like the UEs in the first group 402 communicate among each other using the sidelink communications via the sidelink interface, like the PC5 interface. The UEs within groups 402, 404 and the UEs 406, 408 may further communicate directly with the base station 400 using, for example, the Uu interface. Within the respective groups 402, 404, one of the UEs, some of the UEs or all of the UEs may communicate directly with the base station 400.

Also, UEs 406 and 408, which are not members of any group, may communicate with each other or with any other UE using the sidelink interface, like the PC5 interface.

For the sidelink communication a set of resources 410 is provided from which resources may be allocated to the respective UEs for transmitting data. The set of resources 410 is also referred to as a resource pool, a mini resource pool or a sub-pool. For example, the resources 410 include a time/frequency/space resource grid, and from the resources 410 a subset of resources are selected by the base station 400 (for UEs in NR mode 1) or by the UEs (for UEs in NR mode 2) for allocation to the respective UEs for a communication over the sidelink interface. In the example of FIG. 4, the base station 400 provides for the first group 402 two sets of resources or two mini resource pools 4121 and 4122 which include the resources from the overall resource pool 410 to be used for the sidelink communication within the group 402. For the second group 404, the base station 400 provides a second resource pool 414. It is noted that the present invention is not limited to the depicted embodiment, rather, there may be only a single group of UEs or there may be more than the two depicted groups. Also, the number of UEs forming the group is not limited to the depicted embodiments, rather, any number of UEs may be grouped together. Also, there may be situations in which all UEs are a member of a group and in such scenarios UEs 406 and 408 may not be present or may belong to one or more groups. Also, the number of mini resource pools 412, 414 reserved or provided for the respective groups may be different, for example, the base station may provide less or more mini resource pools for the group 402 or more than one resource pool 414 for the second group 404.

FIG. 4 illustrates an example in which the resource pool comprises a plurality of continuous resources across a frequency domain and adjacent across the time domain, however, the invention is not limited to such configurations, rather, in accordance with other embodiments, the respective resources forming a resource pool may be non-continuous resources across the frequency domain and/or non-adjacent resources across the time domain. Note that resources may also be allocated over the spatial domain utilizing multiple input multiple output (MIMO)-processing at the base station and/or at the UE. The spatial domain may be used in combination with both frequency and/or time domains. The resource pool may include a plurality of groups of resources including at least a first group and a second group, the first and second group having different numerologies, like a different subcarrier spacing, a different slot length or a different number of supported channels. For example, dependent on a quality of service, QoS, requirement, resources to be allocated may be selected from a mini resource pool with the numerology that may be used for meeting the QoS requirements. In accordance with other embodiments, the resource pool may include groups of resources with different numerologies, for example, a first group having a first numerology, as indicated at $410_1$, and a second group with a second numerology as indicated at $410_2$. For example, for group 402, the base station provides the mini resource pool 412 including resources from the first group of resources $410_1$ and from the second group of resources $410_2$. The groups of resources with different numerology may employ different subcarrier spacings, and the respective one or more groups of resources may be referred to as bandwidth parts.

In the Rel. 16 V2X Study Item, 3GPP agreed studying HARQ feedback mechanisms for V2X for unicast and groupcast communication. HARQ is a physical layer mechanism that enables transmitting at aggressive code rates by incorporating feedback from the receiver (destination or receiving UE). Based on the feedback retransmissions may be issued, if needed. However, many issues associated with a feedback mechanism for the sidelink are not addressed so far, e.g., providing feedback to the gNB or providing a groupcast HARQ. For example, when providing feedback to the gNB it is not specified how the feedback is reported to the gNB, since the 5G Uu interface already exists and no interface for reporting SL feedback is specified. For the groupcast HARQ no direct HARQ reporting is specified.

Since a groupcast transmissions has by its own nature several receivers of which each has to report feedback for HARQ, the feedback of multiple UEs is to be multiplexed and how each individual UE need to know where and how to transmit its individual HARQ feedback.

The efficiency of SL HARQ-ACK reporting on the Uu and SL needs to be addressed, because when assuming a high number of SL unicast transmissions generating HARQ feedback, a one by one transmission method is inefficient at least in terms of spectrum.

Also, the alignment between the gNB and the UEs on the Uu for reporting content needs to be addressed. The alignment of the gNB and the reporting UE on what is transmitted needs to be ensured. A misalignment may be caused by the structure of the UCI. In contrast to the DCI, there is no blind decoding scheme with an included CRC. Hence, the gNB and the UE have to be aligned on the content as well as the size of the message.

Further, multiplexing of individual HARQ feedback transmissions for a groupcast transmission may be an issue. In groupcast multiple receivers are expected to provide HARQ-ACK feedback. While it is rather straightforward how this is realized in case of reporting of each UE to the gNB, direct reporting on the SL is not yet addressed. Additionally, reporting via the gNB introduces the problem that all UEs have to be in-coverage which may not expected for all groupcast scenarios. Hence, multiplexing the HARQ-ACK feedback of all member UEs on the SL may be used to support groupcast HARQ.

Figure 5B:
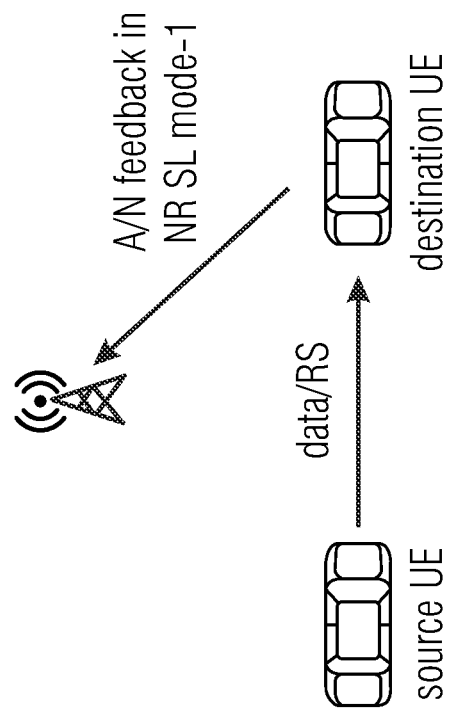
FIG. 5(b) illustrates a destination or receiving UE reporting a HARQ feedback on a SL to a gNB.
Figure 5A:
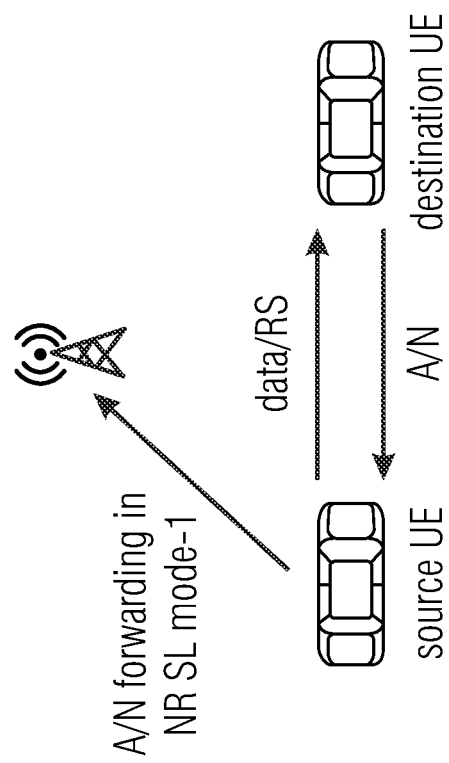
FIG. 5(a) illustrates a source or transmitter UE reporting a HARQ feedback on a SL to a gNB.

As mentioned above, for the scenario of HARQ-ACK reporting to gNB two different approaches are discussed, as shown in FIG. 5. Either the source or transmitter UE (see FIG. 5(a)) or the destination or receiving UE (see FIG. 5(b)) may report the HARQ feedback (ACK/NACK; A/N) to the gNB. This procedure provides the advantage that the gNB may keep the overview and schedule the resources in an efficient manner also for the retransmissions of Mode 1 transmissions.

In case the transmitter (source) UE reports the HARQ-ACK, as illustrated in FIG. 5(a), the receiving or receiver UE reports the HARQ-ACK in the first place to the transmitter UE via the sidelink which then in turn forwards this feedback to the gNB. This may be done directly by forwarding the HARQ feedback itself or by an indication, e.g. a Scheduling Request (SR), to request an additional resource for the retransmission.

In case the receiver (destination or receiving) UE reports the HARQ-ACK, the receiver UE reports the HARQ-ACK to the gNB. The gNB needs to associate the reported HARQ-ACK with the corresponding transmissions by the transmitter UE. For that it either has to be aware about the transmissions received by the receiver UE or the receiver UE has to indicate the transmitter UE/transmission ID.

Figure 5C:
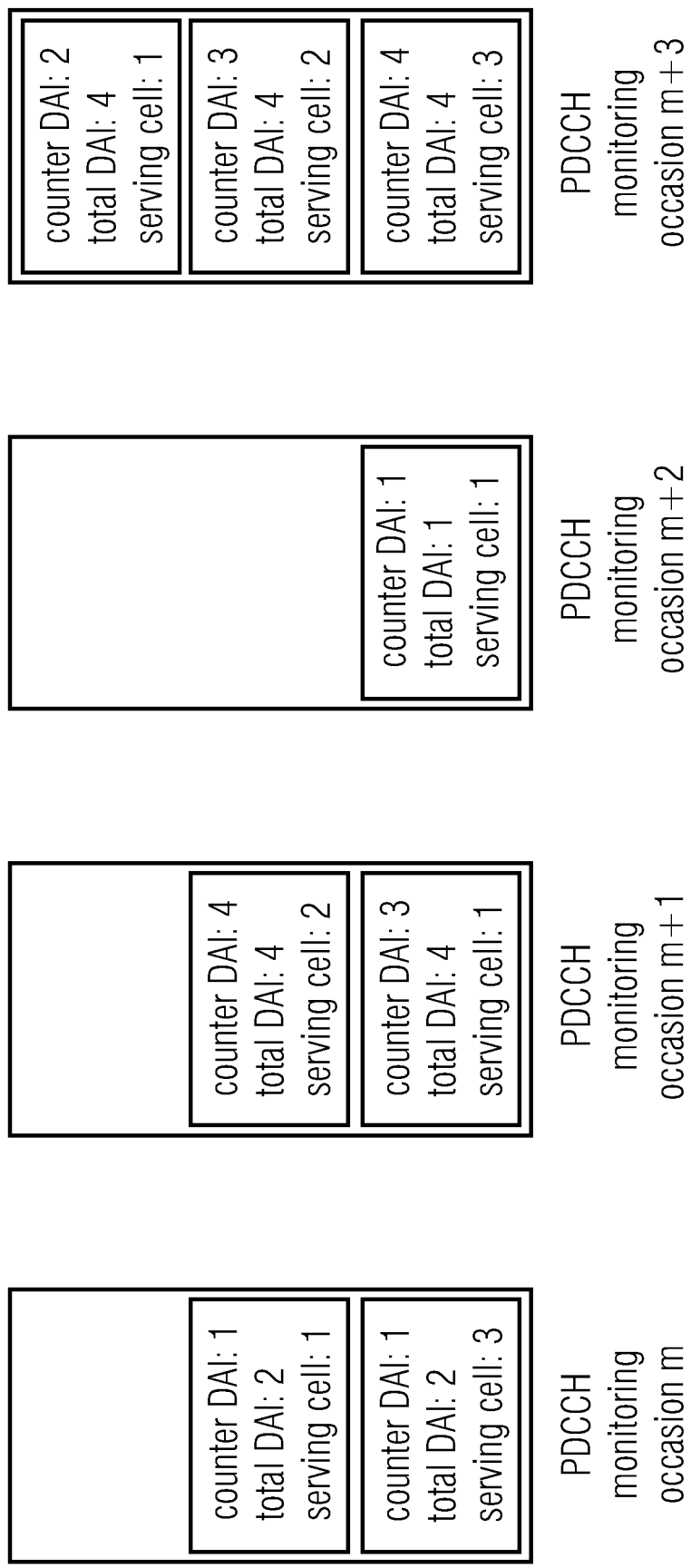
FIG. 5(c) illustrates a dynamic HARQ-ACK codebook procedure involving a total DAI and a counter DAI.

Also, HARQ-ACK codebook procedures may be implemented. For example, in the Uu interface, the UE is configured with slot timing values K_1. K_1 (number of slots) is a set of parameters indicating the timing at which the corresponding HARQ-ACK is transmitted. The corresponding row index of K_1 is conveyed in the DCI in the PDSCH-to-HARQ-timing field or is implicitly determined. The HARQ-ACK feedback of PDSCH transmissions pointing to the same slot for HARQ-ACK reporting is multiplexed and transmitted together in the same UCI. A semi-static HARQ-ACK codebook transmits an ACK or NACK for each PDCCH monitoring occasion associated with a K_1 pointing to the same slot regardless if there was a DCI or not. The advantage of semi-static HARQ-ACK codebook is the fixed number of bits being reported. A dynamic HARQ-ACK codebook transmits an ACK or NACK only for actually scheduled transmissions. The dynamic HARQ-ACK codebook procedure involves extra protection procedures (the total DAI and the counter DAI) to detect potentially missed DCIs such that there is not a mismatch on the number of bits being reported between gNB and UE. As is illustrated in FIG. 5(c), the total DAI counts the number of DCIs format 1_0 and format 1_1 up to PDCCH monitoring occasion m. The counter DAI counts the DCIs format 1_0 and format 1_1 in incremental order. However, no implementation for a sidelink feedback is provided.

Figure 6:
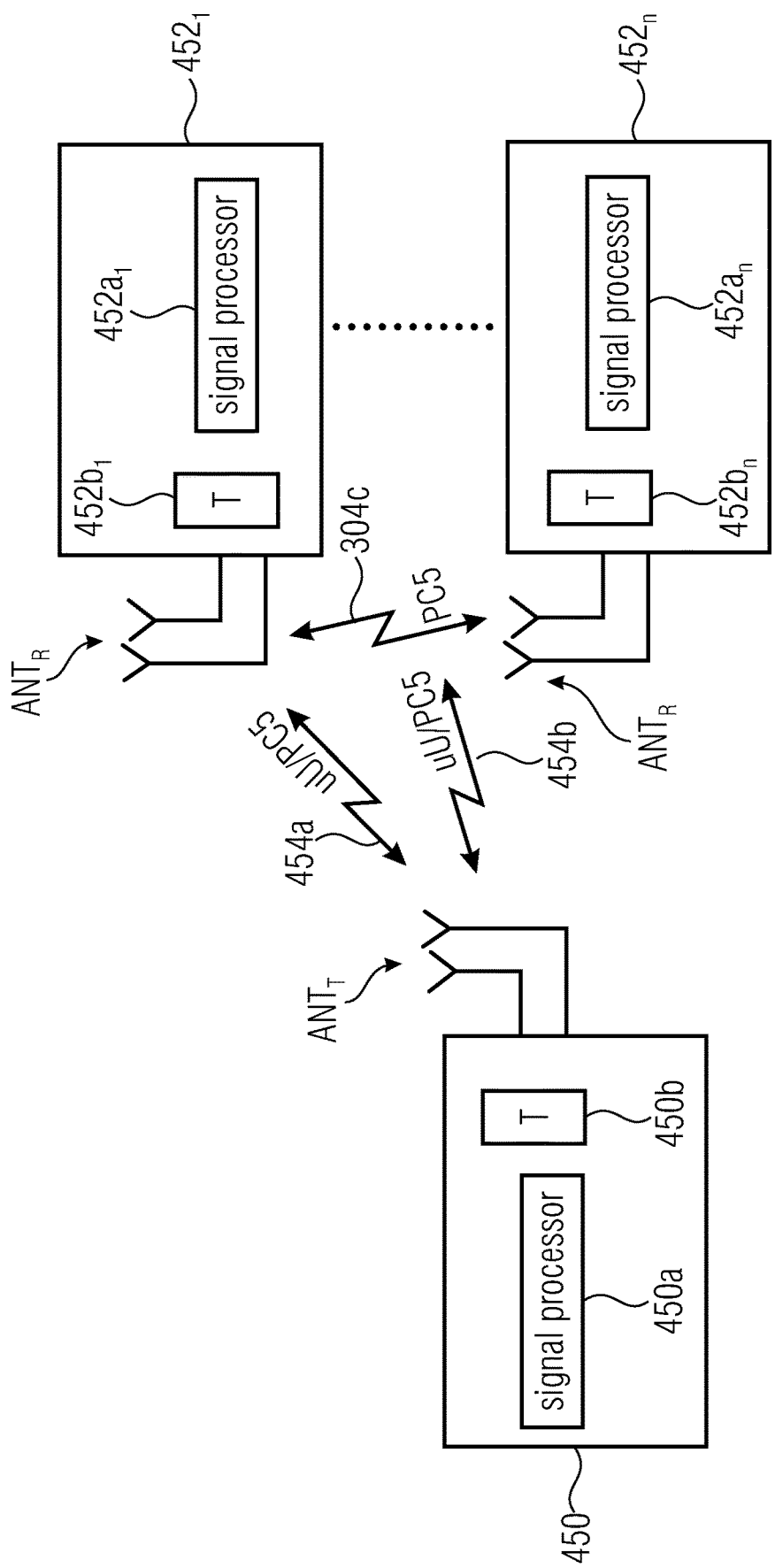
FIG. 6 is a schematic representation of a wireless communication system for communicating information between a transmitter and one or more receivers in accordance with embodiments of the present invention.

The present invention addresses the above issues by providing improvements in the communication over the sidelink as well as improvements in the handling of feedback in the sidelink. Embodiments of the present invention may be implemented in a wireless communication system as depicted in FIG. 1, FIG. 2, FIG. 3 and FIG. 4 including base stations and users, like mobile terminals or IoT devices. FIG. 6 is a schematic representation of a wireless communication system including a transmitter 450, like a base station, and one or more receivers $452_1$ to $452_n$, like user devices, UEs. The transmitter 450 and the receivers 452 may communicate via one or more wireless communication links or channels 454a, 454b, 454c, like a radio link. The transmitter 450 may include one or more antennas $ANT_T$ or an antenna array having a plurality of antenna elements, a signal processor 450a and a transceiver 450b, coupled with each other. The receivers 452 include one or more antennas $ANT_R$ or an antenna array having a plurality of antennas, a signal processor $452a_1$, $452a_n$, and a transceiver $452b_1$, $452b_n$ coupled with each other. The base station 450 and the UEs 452 may communicate via respective first wireless communication links 454a and 454b, like a radio link using the Uu interface, while the UEs 452 may communicate with each other via a second wireless communication link 454c, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 452 and the base stations may operate in accordance with the inventive teachings described herein.

$1^{st}$ Aspect

In accordance with a 1st aspect, the present invention provides an example embodiment of a wireless communication system, comprising:
one or more base stations, and
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmissions a successful or non-successful reception at the receiving UE, and the transmitting UE configured to report the sidelink feedback to a base station,
wherein the base station is configured to provide to the transmitting UE, responsive to the sidelink feedback, sidelink resources for a possible retransmission of a data packet over the sidelink to the receiving UE, and wherein reporting the sidelink feedback to the base station by the transmitting UE is activated or deactivated responsive to one or more conditions.

In accordance with embodiments, reporting the sidelink feedback to the base station by the transmitting UE may be deactivated or disabled responsive to a signaling triggered by the base station, the transmitting UE and/or the receiving UE.

In accordance with the 1st aspect embodiments the one or more conditions include one or more of:
- a desire to reduce PUCCH utilization for the SL feedback, avoid unnecessary reporting overhead on the Uu interface, e.g., in case the traffic on the SL is below a threshold,
- an out-of-coverage timer/trigger,
- a type of traffic: e.g. QoS, reliability and/or latency requirements,
- a trigger by the application,
- a change in link quality or interference level,
- reaching or exceeding a packet loss threshold.

In accordance with embodiments, the 1st aspect or the embodiment of the previous paragraph the base station is configured to send a deactivation signaling to the transmitting UE to deactivate the sidelink feedback reporting, e.g. by RRC or DCI signaling, and responsive to the deactivation signaling from the base station,
- the transmitting UE is configured to stop reporting/forwarding the sidelink feedback, and
- the transmitting UE and the receiving UE are configured to switch to an out-of-coverage sidelink feedback procedure, e.g., a Mode 2 HARQ procedure, or to switch to a data duplication procedure.

In accordance with the 1st aspect and embodiments responsive to the deactivation signaling, a selection of SL resources for the possible retransmission is performed in accordance with an out-of-coverage sidelink feedback procedure autonomously or with base station assistance but not explicitly scheduled by the base station, wherein the base station assistance may include:
- providing resources from a configured pool/mini resource pool (mRP) including out-of-coverage and/or in-coverage resources, and/or
- providing grant-free resources (SPS).

$2^{nd}$ Aspect

In accordance with a 2nd aspect, the present invention provides a wireless communication system, comprising:
- one or more base stations, and
- a plurality of user devices, UEs, configured for a sidelink communication using resources from a set of sidelink resources of the wireless communication system,
- wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE for a plurality of data transmissions, the sidelink feedback indicating for a data transmissions a successful or non-successful reception at the receiving UE, and
- wherein the transmitting UE configured to bundle a plurality of sidelink feedbacks received from the receiving UE for reporting to a base station.

In accordance with the $2^{nd}$ aspect embodiments the wireless communication system is configured to provide additional slot timing values for the sidelink (SL), the additional slot timing values describing the reporting window on the SL.

In accordance with the embodiment in the paragraph directly above and with the DCIs for SL grants include a PSSCH/PDCCH-to-HARQ timing field indicating a slot timing value associated with the SL feedback reporting.

In accordance with the embodiment in the paragraph directly above and with the slot timing value is
- the time from the scheduled data transmission (PSSCH) to the slot in which a corresponding HARQ feedback is to be reported, or
- the time from the received grant (PDCCH) to the slot in which a corresponding HARQ feedback is to be reported.

In accordance with the $2^{nd}$ aspect and any of the three embodiments directly above and with the transmitting UE is configured to bundle the sidelink feedbacks in a separate feedback procedure dedicated for the SL, e.g., a separate HARQ-ACK codebook, or to multiplex the sidelink feedbacks into a feedback procedure dedicated for the Uu, e.g., the Uu or common HARQ-ACK codebook.

In accordance with the embodiment directly above and
- in case the wireless communication system is configured to multiplex the sidelink feedbacks into the feedback procedure dedicated for the Uu, the sidelink feedbacks and downlink feedbacks are reported by the transmitting UE in a common uplink control message, the downlink feedback indicating a successful or non-successful reception of a data transmission from the base station at the transmitting UE, and
- in case the wireless communication system is configured to bundle the sidelink feedbacks in a separate feedback procedure dedicated for the SL, the sidelink feedbacks and downlink feedbacks are reported by the transmitting UE in separate uplink control messages.

In accordance with the $2^{nd}$ aspect and any of the five embodiments directly above and with embodiments the base station is configured to send a signaling to the transmitting UE to activate or deactivate the bundling of the sidelink feedbacks, e.g. by RRC or DCI signaling.

$3^{rd}$ Aspect

In accordance with a 3rd aspect, the present invention provides a wireless communication system, comprising:
- one or more base stations, and
- a plurality of user devices, UEs, configured for a sidelink communication using resources from a set of sidelink resources of the wireless communication system,
- wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmissions a successful or non-successful reception at the receiving UE, and
- wherein the transmitting UE configured to indicate a number of resources that may be used for retransmissions or transmissions on the SL or a single bit requesting a single resource for retransmission or transmission on the SL or wherein the transmitting UE configured to indicate a number of required resources for retransmissions or transmissions on the SL or a single bit requesting a single resource for retransmission or transmission on the SL.

In accordance with the 3rd aspect and embodiments the wireless communication system is to configure the transmitting UE with one or more periodic uplink resources, e.g., a PUCCH resource, for transmitting an uplink control message, like a UCI, to transmit the indication to the base station.

In accordance with the 3rd aspect and embodiments the transmitting UE transmits the uplink control message via the MAC layer, e.g. using MAC Control Elements, to transmit the indication to the base station.

In accordance with the 3rd aspect or with any of the previous two embodiment and the example embodiment of the uplink control message comprises one or more of the following:
- a number of resources requested on the SL for retransmissions,
- a number of resources requested on the SL for retransmissions and transmissions,
- an ID of the receiving UE,
- a single bit requesting a single resource for a transmission or a retransmission e.g. a SL scheduling request.

4th Aspect

In accordance with a 4th aspect, the present invention provides a wireless communication system, comprising:
- one or more base stations, and
- a plurality of user devices, UEs, configured for a sidelink communication using resources from a set of sidelink resources of the wireless communication system,
- wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmissions a successful or non-successful reception at the receiving UE, and
- wherein, responsive to receiving a SL feedback indicating that the data transmission was not received successfully at the receiving UE, the transmitting UE is configured to update the BSR reported by the MAC layer to the base station, the update adding to the BSR a number of additional resources for retransmissions or transmissions on the SL to the corresponding logical channels/logical channel groups.

In accordance with the 4th aspect and embodiments the PHY layer uses received SL grants first for retransmissions and then for new data transmissions.

5th Aspect

In accordance with a 5th aspect, the present invention provides a wireless communication system, comprising:
- one or more base stations, and
- a plurality of user devices, UEs, configured for a sidelink communication using resources from a set of sidelink resources of the wireless communication system,
- wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE, the sidelink feedback indicating for a data transmissions a successful or non-successful reception at the receiving UE,
- wherein the receiving UE is configured to send the sidelink feedback to a base station,
- wherein the base station is configured to provide to the transmitting UE, responsive to the sidelink feedback from the receiving UE, sidelink resources for a possible retransmission of a data packet over the sidelink to the receiving UE, and
- wherein the base station is configured to activate or deactivate reporting the sidelink feedback to the base station by the receiving UE responsive to one or more conditions.

In accordance with the 5th aspect and embodiments reporting the sidelink feedback to 15 the base station by the receiving UE is deactivated or disabled when
- a connectivity status of the transmitting UE is unknown, and/or
- the transmitting UE is out-of-coverage of the base station, and/or
- the receiver UE is out-of-coverage of the base station, and/or
- the transmitting UE and/or the receiving UE transmits using resources of an exceptional resource pool, the exceptional resource pool being preconfigured with the transmitting UE and the receiving UE and used for transmissions in case the transmitting UE and/or the receiving UE are or get out-of-coverage of the base station.

In accordance with the 5th aspect or the previous embodiment with reporting the sidelink feedback to the base station by the receiving UE is deactivated or disabled responsive to a signaling triggered by the base station, the transmitting UE and/or the receiving UE.

In accordance with the 5th aspect and
- in case the signaling is triggered by the base station, the base station is configured to send a signaling to the receiving UE, e.g., by RRC or DCI signaling, to deactivate SL feedback reporting to the base station, and, responsive to the signaling, the receiving UE is configured to stop reporting/forwarding the SL feedback to the base station,
- in case the signaling is triggered by the transmitting UE, the transmitting UE is configured to send a signaling to the receiving UE to deactivate SL feedback reporting to the base station signal, wherein the signaling may be explicit over the SL using resources of the exceptional resource pool, or the signaling may be implicit by not providing Uu resources for a feedback reporting in case the transmitter UE forwards the indication of the Uu resource for HARQ-ACK reporting given by the base station,
- in case the signaling is triggered by the receiving UE, the receiving UE is configured to deactivate SL feedback reporting to the base station signal responsive to being out-of-coverage of the base station.

In accordance with the 5th aspect or the previous two embodiments and responsive to the deactivation of the SL feedback reporting signaling, the transmitting UE and the receiving UE are configured to switch to an out-of-coverage sidelink feedback procedure, e.g., a Mode 2 HARQ procedure.

6th Aspect

In accordance with a 6th aspect, the present invention provides a wireless communication system, comprising:
one or more base stations, and
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE for a plurality of data transmissions, the sidelink feedback indicating for a data transmissions a successful or non-successful reception at the receiving UE, and
wherein the receiving UE configured to bundle a plurality of sidelink feedbacks for reporting to a base station.

In accordance with the 6th aspect and in case the base station is not aware of the transmitting UE, the receiving UE is configured to generate the sidelink feedback for several data transmissions and to bundle the sidelink feedback for reporting to the base station together with one or more IDs of the corresponding transmitting UEs, wherein the maximum number of IDs and maximum number of HARQ-ACK bits provided in the report may be configured or fixed by specification.

In accordance with the previous embodiment and the wireless communication system is to configure the receiving UE with one or more periodic uplink resources, e.g., a PUCCH resource, for transmitting an uplink control message, like a UCI, the uplink control message indicating the pairs of bundled sidelink feedback and the ID of the corresponding transmitting UE.

In accordance with the 6th aspect and embodiments in case the base station is aware of the transmitting UE, the receiving UE is configured to generate the sidelink feedback for several data transmissions and to bundle the sidelink feedback for reporting to the base station.

In accordance with the previous embodiment and the wireless communication system is to configure the receiving UE with one or more periodic uplink resources, e.g., a PUCCH resource, for transmitting an uplink control message, like a UCI, the uplink control message indicating the bundled sidelink feedback.

In accordance with any one of previous five embodiments and the receiving UE is configured to bundle the sidelink feedbacks in a separate feedback procedure dedicated for the SL, e.g., a separate HARQ-ACK codebook, or to multiplex the sidelink feedbacks into a feedback procedure dedicated for the Uu, e.g., the Uu or common HARQ-ACK codebook.

In accordance with any one of previous six embodiments and the base station is configured to send a signaling to the receiving UE to activate or deactivate the bundling of the sidelink feedbacks, e.g. by RRC or DCI signaling.

7th Aspect

In accordance with a 7th aspect, the present invention provides a wireless communication system, comprising:
one or more base stations, and
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication, the receiving UE configured to send over the sidelink a sidelink feedback to the transmitting UE for a plurality of data transmissions, the sidelink feedback indicating for a data transmissions a successful or non-successful reception at the receiving UE, and
wherein the receiving UE configured to bundle a plurality of sidelink feedbacks for reporting to the transmitting UE over the sidelink.

In accordance with the 7th aspect and,
the transmitting UE is configured to signal to the receiving UE a feedback request indicator, e.g., in a SCI message, the indicator being set to a first value or to a second value, the first value indicating that the receiving UE is to bundle the sidelink feedback, and the second value indicating that a part of the resources associated with the SCI message are reserved for the receiving UE, wherein a size of the reserved resources may be fixed or may be indicated in the SCI message, and
the receiving UE is configured to transmit, responsive to receiving the feedback request indicator being set to the second value, the bundled sidelink feedback using the reserved resources.

In accordance with the previous embodiment and the receiving UE is configured to indicate, using a sidelink assignment index (SAi), missed transmissions with a NACK in the corresponding order in the bundled feedback.

In accordance with the previous embodiment and the receiving UE reports a NACK for all transmission which do not fulfill the minimum processing time requirements at the time of reporting.

In accordance with the 7th aspect and embodiments
the transmitting UE is configured to signal to the receiving UE a feedback timing indicator, e.g., in a SCI message, the indicator being set to one of a plurality of first values or to a second value, the first values indicating that the receiving UE is to bundle the sidelink feedback, and the second value indicating that a part of the resources associated with the SCI message are reserved for the receiving UE, wherein a size of the reserved resources may be fixed or may be indicated in the SCI message, and
the receiving UE is configured to transmit, responsive to receiving the feedback timing indicator indicating that the feedback it to be transmitted, the bundled sidelink feedback using the reserved resources.

In accordance with the previous embodiment and the receiving UE sets the feedback for not received feedback timing indicators to NACK.

In accordance with any of the two previous embodiments and the transmitting UE is configured to request from the receiving UE an immediate sidelink feedback by sending to the receiving UE, instead of a first value, the second value for the feedback timing indicator.

In accordance with any of the three previous embodiments and the feedback timing indicator points to a specific resource, e.g. the number of slots from current resource to the resource in which the feedback is to be provided.

In accordance with any of the three previous embodiments and the feedback timing indicator is the number of transmissions till reporting, e.g. a counter which starts with the largest number and decreases with each transmission by one.

In accordance with the 7th aspect and the wireless communication system is to configure the receiving UE to bundle and report the sidelink feedback over a certain window of time slots or transmissions to the transmitting UE, wherein the window may be defined by one
or more of:
  a window size in transmissions,
  a window size in slots,
  a window size given by the slot timing value.

In accordance with the previous embodiment and the receiving UE is configured to transmit the sidelink feedback in its own transmission, and wherein the receiving UE may signal to the transmitting UE that its data region includes control data, the control data including the sidelink feedback.

In accordance with the previous embodiment and reporting the sidelink feedback is triggered by the receiving UE or by the transmitting UE.

In accordance with the previous embodiment and in case reporting the sidelink feedback is triggered by the transmitting UE,
  the transmitting UE is configured to signal to the receiving UE an indicator, e.g., in a SCI message, and
  the receiving UE is configured to transmit, responsive to receiving the indicator, the bundled sidelink feedback in a next transmission either multiplexed with data or not.

8$^{th}$ Aspect

In accordance with an 8th aspect, the present invention provides a wireless communication system, comprising:
  one or more base stations, and
  a plurality of user devices, UEs, configured for a sidelink communication using resources from a set of sidelink resources of the wireless communication system,
  wherein the plurality of UEs comprises at least one transmitting UE and a plurality of receiving UEs, the transmitting UE and the receiving UEs configured to use at least a subset of the sidelink resources of the wireless communication system for the sidelink communication, the receiving UEs configured to send over the sidelink a sidelink feedback to the transmitting UE for a data transmission, the sidelink feedback indicating for a data transmissions a successful or non-successful reception at the respective receiving UE, and
  wherein the receiving UEs are configured to report respective sidelink feedbacks to the transmitting UE over the sidelink on common feedback resources using UE-specific feedback sequences.

In accordance with the 8th aspect embodiments the UE-specific sequence indicates a non-successful data transmission In accordance with any of the two previous embodiments and in case the UEs form a group, the UE-specific sequences are either configured during group setup or are derived implicitly from, e.g., a member ID of the UE.

9$^{th}$ Aspect

In accordance with a 9th aspect, the present invention provides a wireless communication system, comprising:
  one or more base stations, and
  a plurality of user devices, UEs, configured for a sidelink communication using resources from a set of sidelink resources of the wireless communication system,
  wherein the plurality of UEs comprises at least one transmitting UE and a plurality of receiving UEs, the transmitting UE and the receiving UEs configured to use at least a subset of the sidelink resources of the wireless communication system for the sidelink communication, the receiving UEs configured to send over the sidelink a sidelink feedback to the transmitting UE for a data transmission, the sidelink feedback indicating for a data transmissions a successful or non-successful reception at the respective receiving UE, and
  wherein the receiving UEs are configured to report respective sidelink feedbacks to the transmitting UE over the sidelink on common feedback resources using a first channel to transmit a first sequence in case a feedback represents a successful transmission and a second channel to transmit a second sequence in case a feedback represents a non-successful transmission.

In accordance with the 9th aspect and the first and second channels comprise different resources and/or use different, e.g., orthogonal, sequences to signal a successful transmission and a non-successful transmission, respectively.

In accordance with any of the two previous embodiments and wherein each receiving UE is configured to transmit in the first channel if it could decode the transmission successfully, otherwise it transmits in the second channel.

In accordance with any of the 9th aspect or 9th aspect and the first and second channels comprise different resources and/or use different, e.g., orthogonal, sequences to signal a successful transmission and a non-successful transmission, respectively. two previous embodiments and wherein the first channel is a SCI-confirmation channel, and wherein each receiving UE is configured to transmit in the SCI-confirmation channel independent of the decoding outcome, and, if the transmission cannot be decoded, the receiving UE transmits in the second channel additionally.

10$^{th}$ Aspect

In accordance with a 10th aspect, the present invention provides a wireless communication system, comprising:
  one or more base stations, and
  a plurality of user devices, UEs, configured for a sidelink communication using resources from a set of sidelink resources of the wireless communication system,
  wherein the plurality of UEs comprises at least one transmitting UE and a plurality of receiving UEs, the transmitting UE and the receiving UEs configured to use at least a subset of the sidelink resources of the wireless communication system for the sidelink communication, the receiving UEs configured to send over the sidelink a sidelink feedback to the transmitting UE for a data transmission, the sidelink feedback indicating for a data transmissions a successful or non-successful reception at the respective receiving UE, and
  wherein the receiving UEs are configured to report respective sidelink feedbacks to the transmitting UE over the sidelink, wherein feedback from the respective receiving UEs are transmitted using separate feedback resources.

In accordance with the 10th aspect a channel is used to report the feedback, the first channel being is split into respective sub-resources, each sub-resource being used by a single receiving UE.

In accordance with the previous embodiment wherein using the UE ID and the group size, the receiving UE derives its sub-resources for transmitting the feedback, wherein the number of sub-resources may be determined either dynamically, e.g., using on an actual group size, or by using the maximum group size, which may be configurable or fixed.

In accordance with any of the preceding embodiments the transmitting UE is configured to signal to the receiving UE a sidelink assignment index (SAI), e.g., in a SCI message, so as to allow the receiving UE to detect missed transmissions, wherein for a first transmission to a certain receiving UE a SAI counter is set in an initial value and the SAI counter is increased with each transmission to said certain receiving UE.

11$^{th}$ Aspect

In accordance with an 11th aspect, the present invention provides a wireless communication system, comprising:
one or more base stations, and
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication,
wherein the wireless communication system is configured to schedule a transport block (TB) over multiple resource blocks, like multiple time slots and/or frequency bands, in the sidelink resources.

In accordance with the 11th aspect the wireless communication system is configured to schedule the transport block (TB) over multiple resource blocks using a single sidelink control message indicating an allocation over multiple resources or using several sidelink control messages, each sidelink control message indicating its associated resources.

In accordance with any of the two previous embodiments and a TB is divided into Code Block Groups (CBG). Each of the CBGs being decodable on its own and generating one HARQ feedback bit.

In accordance with the previous embodiment and a CBG is mapped to a resource block.

In accordance with a TB is divided into Code Block Groups (CBG) wherein each of the CBGs being decodable on its own and generating one HARQ feedback bit and a first CBG is mapped to a first region of a resource block corresponding to data in other transmissions and a second CBG is mapped into a second region of the resource block corresponding to a feedback region used by a different UE than the UE using the data region.

In accordance with any of the five previous embodiments in case several sidelink control messages are used to schedule the transport block (TB) over multiple resource blocks, a CBG transmission indicator is used to indicate which CBGs are transmitted in a current transmission, wherein the indicator may include one or more of: a number of transmitted CBGs,
the CBG transmission, if the number is fixed, e.g., by RRC signaling,
a bit string indicating the actually transmitted CB Gs in the associated data region.

In accordance with any of the six previous embodiments the receiving UE is configured to send a sidelink feedback to the transmitting UE over the sidelink, the sidelink feedback indicating for a data transmissions a successful or non-successful reception at the receiving UE, and
a sidelink assignment index (SAI) in the single sidelink control message is increased by one per CBG so as to ensure that even if the receiving UE misses the whole CBG transmission, the receiving UE knows how many bits of feedback to transmit.

In accordance with any of the seven previous embodiments
the receiving UE is configured to send a sidelink feedback to the transmitting UE over the sidelink, the sidelink feedback indicating for a data transmission a successful or non-successful reception at the receiving UE, and
in case the number of resource blocks is fixed per transmission, e.g. RRC configured or indicated in the SCI, the receiving UE is configured to generate for each of the actually transmitted CBGs or for the maximum number of CBGS a feedback for the transmission of the respective resource block.

12$^{th}$ Aspect

In accordance with a 12th aspect, the present invention provides a wireless communication system, comprising:
one or more base stations, and
a plurality of user devices, UEs, configured for a sidelink communication using resources from a set of sidelink resources of the wireless communication system,
wherein the plurality of UEs comprises at least one transmitting UE and at least one receiving UE, the transmitting UE and the receiving UE configured to use at least a subset of the sidelink resources of the wireless communication system for the sidelink communication,
wherein the wireless communication system is configured to provide a signaling via the SL, e.g. using SL RRC signaling, or by the base station, e.g. using RRC signaling, to one or more transmitting UEs, the signaling indicating periodic transmissions of one or more of the receiving UEs, and
wherein, responsive to the signaling, the one or more transmitting UEs are configured to not transmit during the signaled periodic transmissions.

In accordance with the 12th aspect embodiments the receiving UE is configured to forward a sensing report to the transmitting UE so that the transmitting UE is aware of potentially interfered resources.

In accordance with any of the preceding embodiments and the sidelink communication comprises.
a unicast transmission from the transmitting UE to the receiving UE,
a multicast transmission from the transmitting UE to a plurality of receiving UEs,
a groupcast from the transmitting UE to a plurality of receiving UEs, the transmitting UE and a plurality of receiving UEs forming a group of UEs, and
a broadcast transmission by the transmitting UE.

In accordance with any of the preceding embodiments and retransmission includes:
(i) transmitting the data packet itself, or
(ii) transmitting one or more duplicates of the data packet, or
(iii) transmitting one or more redundancy versions of the data packet, or
(iv) transmitting one or more erasure correction codes for the data packet, or
(v) a combination of any of (i) to (iv).

In accordance with any of the preceding embodiments and the one or more redundancy versions provide for an incremental redundancy at a receiver.

In accordance with any of the preceding embodiments and the sidelink resources include at least a first group of resources having a first numerology and a second group of resources having a second numerology, the first and second numerologies being different.

In accordance with any of the preceding embodiments and the set of sidelink resources and/or the subset set of sidelink resources comprises a plurality of contiguous or non-contiguous resources across a frequency domain and adjacent or non-adjacent across a time domain.

In accordance with any of the preceding embodiments and the set of side link resources defines one or more of:
  a resource pool (RP),
  a mini-resource pool (mRP),
  a band width part, BWP, in a resource pool,
  a resource pool in a BWP.

In accordance with any of the preceding embodiments and the plurality of UEs comprise one or more of: a mobile terminal, or stationary terminal, or cellular IoT-UE, or vehicular UE, or vehicular group leader (GL) UE, or an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator.

In accordance with any of the preceding embodiments and the base station comprises one or more of a macro cell base station, or a small cell base station, or a central unit of a base station, or a distributed unit of a base station, or a road side unit, or a UE, or a group leader (GL), a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

In accordance with further aspects, the present invention provides a base station for the inventive wireless communication system described herein.

In accordance with further aspects, the present invention provides a user device, UE, for the inventive wireless communication system described herein.

In accordance with further aspects, the present invention provides method for operating the inventive wireless communication system described herein.

Computer Program Product

The present invention provides a computer program product comprising instructions which, when the program is executed by a computer, causes the computer to carry out one or more methods in accordance with the present invention.

Thus, the present invention provides improvements in the communication over the sidelink as well as improvements in the handling of feedback in the sidelink. To improve efficiency and interworking of Uu and SL transmissions the present invention proposes various procedures.

In accordance with an aspect of the inventive approach, embodiments provide a feedback bundling for HARQ-ACK reporting via the gNB. For example, one or more of the following may be implemented (as shall be described in more detail below):

separate K1 slot timing values for the sidelink (SL) may be provided,
  a separate DAI for the SL,
  a HARQ-ACK codebook based on the DAI and K1 slot timing values.

This aspect improves the efficiency for the scenario that a UE reports HARQ-ACK to the gNB. Since HARQ-ACK feedback is to be provided for each transmission, it is inefficient to transmit, e.g., each feedback bit one by one to the gNB. Hence, bundling the feedback and transmitting it together to the gNB improves the spectral efficiency significantly. This aspect includes different procedures to bundle the HARQ-ACK feedback for SL transmissions and to transmit it on the Uu interface, as shall be described in more detail below.

In accordance with another aspect of the inventive approach, embodiments provide for a feedback bundling for HARQ-ACK reporting on the SL. For example, one or more of the following may be implemented (as shall be described in more detail below):
  a Sidelink Assignment Index (SAI) on the sidelink,
  a feedback request field in SCI
  a HARQ timing indicator in SCI
  an asynchronous HARQ reporting At least for Mode 2 and possibly also for Mode 1, the UE is expected to transmit HARQ-ACK feedback via the SL interface. However, as mentioned previously, if large amounts of data are transmitted via SL, a lot of HARQ-ACK feedback is generated. A one by one transmission degrades the spectral efficiency of SL HARQ-ACK transmissions. Hence, this aspect proposes different bundling procedures to transmit HARQ-ACK feedback on the SL interface, as shall be described in more detail below.

In accordance with a yet another aspect of the inventive approach, embodiments provide for groupcast HARQ-ACK multiplexing. For example, one or more of the following may be implemented (as shall be described in more detail below):
  different NACK sequences
  ACK/SCI-confirmation channel
  implicit determination of groupcast HARQ-ACK subresources For groupcast transmissions, multiple UEs have to provide HARQ-ACK feedback to the source UE, but know approaches for HARQ-ACK transmission over the SL several restrictions and drawbacks. This aspect proposes solutions to cope with these restrictions and drawbacks so as to improve HARQ-ACK feedback transmission on the SL for a groupcast, as shall be described in more detail below.

In accordance with a further aspect of the inventive approach, embodiments provide for a code block group (CBG) or resource block (RB) transmission. For example, one or more of the following may be implemented (as shall be described in more detail below):
  a SL transport block (TB) transmission over multiple resources
  one or more CBG HARQ-ACK feedbacks (e.g., one HARQ-ACK bit per resource in case the feedback and the data are not split, or in case the feedback and the data are split, a resource block may be split into two CBGs so that there are two HARQ-ACK bits per resource)

Transmitting large amounts of data may be restricted by the resource unit size in the SL. Hence, transmissions spanning RBs, like multiple time and/or frequency resource units, may be used. This aspect proposes a SL transmission spanning multiple resource units or RBs in time and/or frequency. This may also affect the interference behavior since parts of such a large transmission may be affected more severely by interference than others. That leads to unequal error probabilities for each resource unit of the transport block (TB). Thus, retransmitting the whole block is inefficient because the other parts not affected by interference will be decoded properly in most of the cases. Therefore, a finer, more granular HARQ-ACK feedback is proposed to enable a more efficient retransmission, as shall be described in more detail below.

In accordance with a yet further aspect of the inventive approach, embodiments provide a link information message (Mode 2). For example, the destination UE may make the source UE aware of its transmit windows. In out-of-coverage scenarios, i.e., Mode 2, collisions due to the half-duplex constraint may arise. This comes from the limitation that a UE may not be able to receive and transmit at the same time. Hence, if it receives a packet during transmission this inevitably results in a packet failure. This issue is addressed by the inventive approach by providing or introducing a link information message which tells another SL UE which timeslots to avoid due to periodic transmissions, e.g. SPS, reference symbol transmissions or other kind of predictable transmissions, as shall be described in more detail below.

Embodiments of the present invention will now be described in more detail.

Enhancements for SL Harq with Transmitter UE Reporting Harq-ACK to the gNB

Activation/Deactivation of HARQ-ACK reporting

Embodiments of the present invention implement an activation/deactivation of the HARQ-ACK reporting. In case the transmitter/source UE reports the HARQ-ACK feedback to the gNB, it is clear for the gNB to which UE to provide the SL grant for a possible retransmission. Also, the issue that the source UE is out-of-coverage and may not be provided with a SL grant, is not a problem since in that case the source UE does not transmit the HARQ-ACK to the gNB and may automatically switch to a Mode 2 HARQ scheme.

However, even in coverage it may be beneficial to stop the source UE from reporting HARQ-ACK to the gNB, e.g., to reduce PUCCH utilization on the SL and/or if there is not much traffic on the SL to avoid unnecessary reporting overhead on Uu.

The gNB sends a signaling to the reporting UE (the UE transmitting the HARQ-ACK feedback to gNB) to activate or deactivate HARQ-ACK reporting, e.g. by RRC or DCI. The reporting UE then stops reporting/forwarding the HARQ-ACK feedback to the gNB. In this case, the HARQ procedure may automatically switch to the Mode 2 HARQ procedure (out-of-coverage procedure).

After receiving the deactivation signaling, the transmitter UE stops forwarding/indicating SL HARQ-ACK to the gNB. The resource selection for future retransmissions may be performed as in Mode 2 autonomously or with gNB assistance but not explicitly scheduled by the gNB.

For example, RRC enabling and disabling of the SL HARQ reporting may employ the following RRC PUCCH-Config information element

| PUCCH-Config ::= SEQUENCE { |  |
| --- | --- |
| ... |  |
| sl-HARQ-ACK-reporting | BOOLEAN |
| ... |  |
| } |  |

For example, for a destination-specific reporting (UE reports only for explicitly indicated SL destination IDs) the following RRC PUCCH-Config information element may be employed:

| PUCCH-Config ::= SEQUENCE { |  |
| --- | --- |
| ... |  |
| sl-HARQ-ACK-reporting | SEQUENCE |
| (SIZE (1..n)) OF SL-DESTINATION-ID |  |
| ... |  |
| } |  |

Feedback Bundling for Feedback Reporting to the gNB

In the Uu interface, the UE may bundle the HARQ-ACK feedback for DL transmissions in so-called HARQ-ACK codebooks and transmit them in the PUCCH or the PUSCH to the gNB. However, these mechanisms are designed for DL only and do not consider any SL transmissions. Therefore, embodiments of the present invention propose an approach to incorporate the SL HARQ-ACK feedback in the PUCCH or PUSCH transmissions.

In accordance with embodiments, the transmitter UE awaits the HARQ-ACK feedback for several transmissions from the receiving UE and bundles it (the feedback) for reporting to the gNB. This enables a more efficient transmission in the Uu interface. The bundling may be activated or deactivated by gNB, by e.g. DCI or RRC signaling. In the Uu interface, the UE may bundle the HARQ-ACK feedback in so-called HARQ-ACK codebooks, which may operate in dynamic or semi-static mode. The UE may bundle the SL HARQ-ACK feedback either in a separate HARQ-ACK codebook procedure dedicated for SL or multiplex the SL HARQ-ACK into the Uu HARQ-ACK codebook (common codebook).

Separate Slot Timing Values K1 for SL

In accordance with embodiments, separate slot timings K_1 may be used for the SL. Since the SL HARQ procedure is expected to take more time if the transmitter UE is reporting when compared to a Uu HARQ, additional slot timing values K_1 are provided to describe the reporting window on the SL. The PDSCH-to-HARQ timing field may be conveyed in DCIs for SL grants and indicates one slot timing value K_1 associated with the SL feedback reporting.

For example, the following RRC PUCCH-Config information element may be employed:

| PUCCH-Config ::= SEQUENCE { |  |
| --- | --- |
| ... |  |
| dl-DataToUL-ACK | SEQUENCE |
| (SIZE (1..8)) OF INTEGER (0..15) |  |
| sl-DataToUL-ACK | SEQUENCE |
| (SIZE (1..8)) OF INTEGER (0..15) |  |
| ... |  |
| } |  |

For example, a DCI format for scheduling the SL may be scrambled with the corresponding UE-specific RNTI and include one or more of:
- a frequency domain resource assignment,
- a time domain resource assignment,
- a modulation and coding scheme (MCS)—5 bits (optional),
- a new data indicator—1 bit (optional),
- a redundancy version—2 bits (optional),
- a HARQ process number—4 bits (optional),
- a downlink assignment index (DAI)—2 bits as defined in Subclause 9.1.3 of [5, TS 38.213], as counter DAI, a PSSCH/PDCCH-to-HARQ_feedback timing indicator corresponding to one of sl-DataToUL-ACK values The reference of the K_1 value indicated by the PSSCH/PDCCH-to-HARQ_feedback timing indicator may either be the PSSCH or the PDCCH scheduling the corresponding PSSCH.

HARQ-ACK Codebooks

Common HARQ-ACK Codebook

Figure 7:
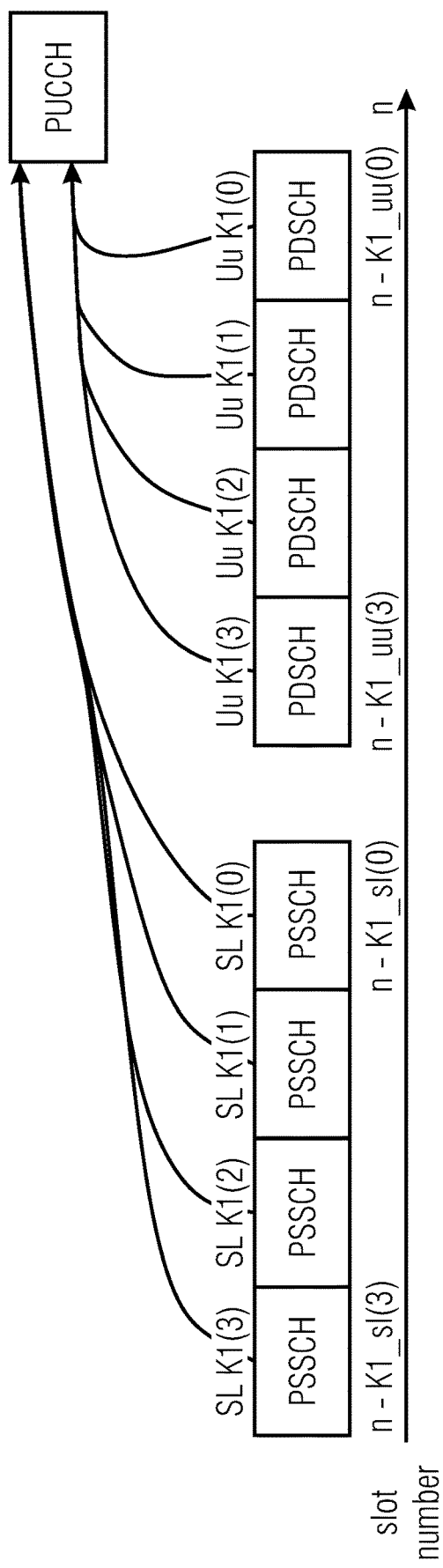
FIG. 7 illustrates respective PSSCH transmissions on the sidelink and on the Uu, which include SL and DL feedback information reported by a transmitting UE in a common PUCCH.

In accordance with embodiments, the SL interface may be treated as an additional serving cell. Hence, the DAI also counts DCIs for scheduling the SL grants so that the UE is able to detect missed SL grants. As is illustrated in FIG. 7, the respective PSSCH transmissions on the sidelink, which include the SL feedback information, have associated respective SL K1 slot timing values indicating the number of slots until the feedback is to be reported in the PUCCH. The respective PSSCH transmissions on the Uu, which include the DL feedback information, have associated respective DL K1 slot timing values (as is known in the art) indicating the number of slots until the feedback is to be reported in the PUCCH. The transmitting UE may report all the feedback information, e.g., all HARQ-ACK, in slot n which is indicated by the K1 values.

Separate HARQ-ACK Codebook

Figure 8:
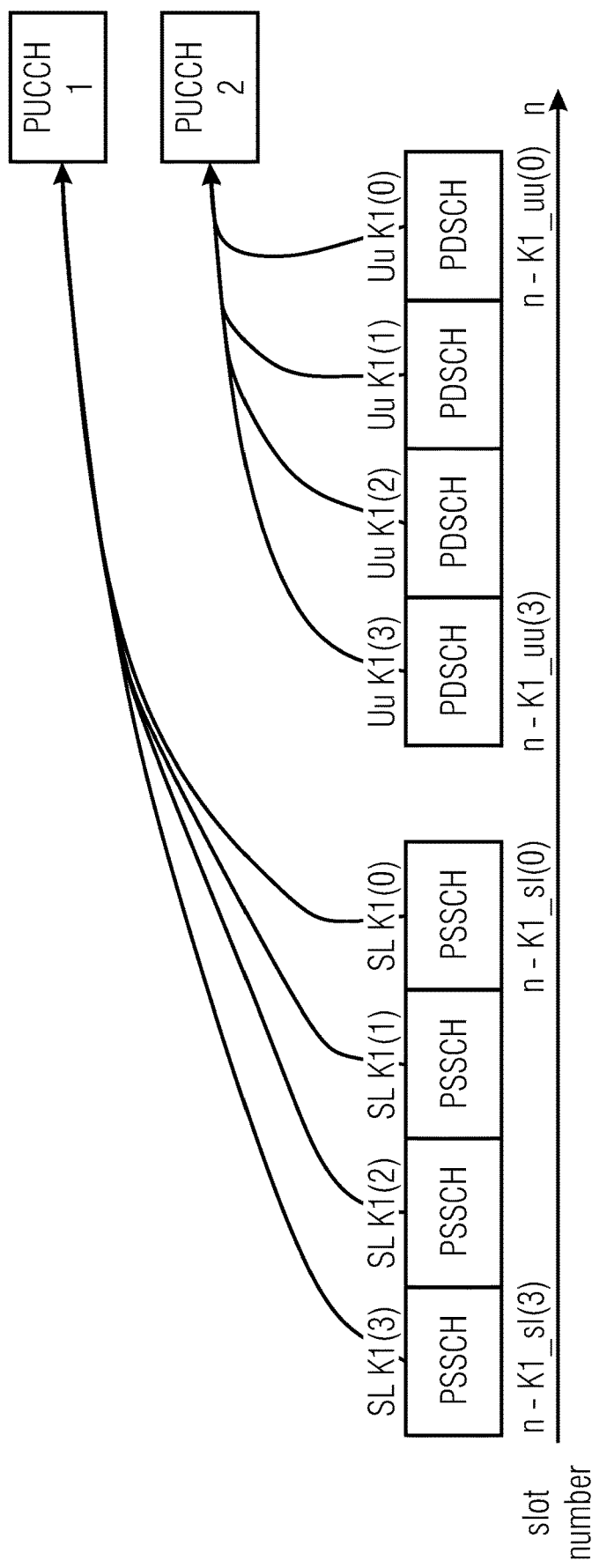
FIG. 8 illustrates respective PSSCH transmissions on the sidelink and on the Uu, which include SL and DL feedback information reported by a transmitting UE in different PUCCHs.

In accordance with embodiments, the DAI for scheduling SL transmissions in the DCI may incremented independently from the DAI for Uu transmissions. The PDCCH monitoring occasions for Uu grants and for SL grants are handled independently. Thus, the UE is able to detect missed SL grants based on the SL DAI. As is illustrated in FIG. 8, the respective PSSCH transmissions on the sidelink, which include the SL feedback information, have associated respective SL K1 slot timing values indicating the number of slots until the feedback is to be reported in a PUCCH 1 used for the SL feedback. The respective PSSCH transmissions on the Uu, which include the DL feedback information, have associated respective DL K1 slot timing values (as is known in the art) indicating the number of slots until the feedback is to be reported in a PUCCH 2 different from PUCCH 1.

The transmitting UE may report the feedback information, e.g., SL and DL HARQ-ACK, in slot n which is indicated by the K1 values but in different PUCCH. In accordance with other embodiments, the SL and DL HARQ-ACK may be reported in different slots.

In accordance with embodiments, the HARQ-ACK codebook may be constructed based on a semi-static or on a dynamic method, and codebook related parameters may be conveyed in DCIs for scheduling SL grants.

For example, a DCI format for scheduling SL may be scrambled with the corresponding UE-specific RNTI and include one or more of:

a frequency domain resource assignment
a time domain resource assignment
a modulation and coding scheme (MCS) - 5 bits (optional)
a new data indicator - 1 bit (optional)
a redundancy version - 2 bits (optional)
a HARQ process number - 4 bits (optional)
a downlink assignment index (DAI) - 2 bits (separate DAI for SL assignments (DCI formats corresponding to SL))
a PSSCH/PDCCH-to-HARQ_feedback timing indicator corresponding to one of sl-DataToUL-ACK values MAC Buffer Status Report (BSR) Update The packets passed from the MAC layer to the PHY do not appear anymore in the BSR, which is reported from the MAC of the UE to the gNB to ask for new resources. In case a transmission fails in the SL and a retransmission may be used, a new resource has to be allocated. In accordance with embodiments, it is proposed that in that case the PHY layer reports the failed transmission to the MAC layer such that the failed transmission may be handled as a new packet from a MAC perspective. The MAC layer sums up the size of the retransmission to the corresponding logical channel in the BSR so that when asking for the resources using the BSR, also resources for the retransmission may be provided by the base station.

Periodic Resource Request Report (RRR) on PUCCH

In accordance with embodiments, the transmitting UE is configured with a periodic PUCCH resource for transmitting a UCI indicating the number of resources that may be used for retransmissions/transmissions. The Resource Request Report (RRR) may include one or more of the following:

```
< integer> - number of resource requested on SL for retransmissions
< integer> - number of resource requested on SL for retransmissions + transmissions
list(<UE ID, integer>) - list of pairs {UE ID, number of request resources for re-/transmissions to
   that UE ID}
```

Resource Request Report (RRR) on MAC

In accordance with embodiments, the transmitting UE is configured to report the number of resources that may be used on the MAC layer. This may be triggered by the transmitting UE itself, the network or may be configured to be periodically. The Resource Request Report (RRR) may include one or more of the following:

```
< integer> - number of resource requested on SL for retransmissions
< integer> - number of resource requested on SL for retransmissions + transmissions
list(<UE ID, integer>) - list of pairs {UE ID, number of request resources for re-/transmissions to
   that UE ID}
```

Sidelink Scheduling Request:

In accordance with embodiments, the transmitting UE is configured, e.g. via Uu RRC, with an additional scheduling request bit which it reports in each UCI reporting HARQ-ACK to the gNB. In case that the UE needs a SL resource due to an unexpected retransmission, the UE sets this bit to one which indicates the gNB that the UE necessitates a SL resource. In response the gNB provides a SL grant for the said UE.

For example, the following element may be employed in the Uu RRC configuration:

```
-- ASN1START
-- TAG-SCHEDULING-REQUEST-CONFIG-START
SL-SchedulingRequestConfig ::= SEQUENCE {
schedulingRequestToAddModList    SEQUENCE (SIZE (1..max)) OF
SchedulingRequestToAddMod
schedulingRequestToReleaseList   SEQUENCE (SIZE (1..max)) OF
SchedulingRequestId
}
```

Enhancements for SL Harq with Receiver UE Reporting Harq-ACK to the gNB

Activation/Deactivation of HARQ-ACK Reporting

When letting the destination UE report the HARQ-ACK feedback, a current connectivity status of the source UE may not be known at the destination UE side. For example, this may be a problem if a retransmission is requested by the destination UE but the source UE is out-of-coverage. In this case, the gNB may not reach the source UE to provide resources for retransmission. Hence, in accordance with embodiments, it is proposed to disable HARQ-ACK reporting to the gNB. The signaling may be triggered either by the gNB or by the source UE or by the destination UE.

gNB Triggered

In accordance with embodiments, the gNB sends a signaling to the reporting UE (the UE transmitting the HARQ-ACK feedback to the gNB) to activate or deactivate the HARQ-ACK reporting, e.g. by RRC or DCI. The reporting UE then stops reporting/forwarding the HARQ-ACK feedback to the gNB. In this case, the HARQ procedure may automatically switch to the Mode 2 HARQ procedure (out-of-coverage procedure) with autonomous or only gNB assisted resource selection by the transmitter UE. The gNB assistance may incorporate a resource pool/mini-resource pool configuration or configured grants in a SPS-like manner.

Source UE Triggered

In accordance with embodiments, the transmitter UE activates/deactivates HARQ-ACK reporting of the receiver UE depending on its own coverage situation. When being out-of-coverage, the transmitter UE may not receive any SL resource grants by the gNB, and it assigns the receiver UE to switch to the Mode 2 HARQ procedure, e.g. implicitly by providing or not providing a SL resource for HARQ-ACK reporting or by using a corresponding pool (Mode 1/Mode 2 pool, etc.).

Destination UE Triggered

In accordance with embodiments, the destination UE tells the source UE that it is out-of-coverage and should expect the HARQ-ACK on the SL. The receiver UE also informs the gNB.

Figure 9:
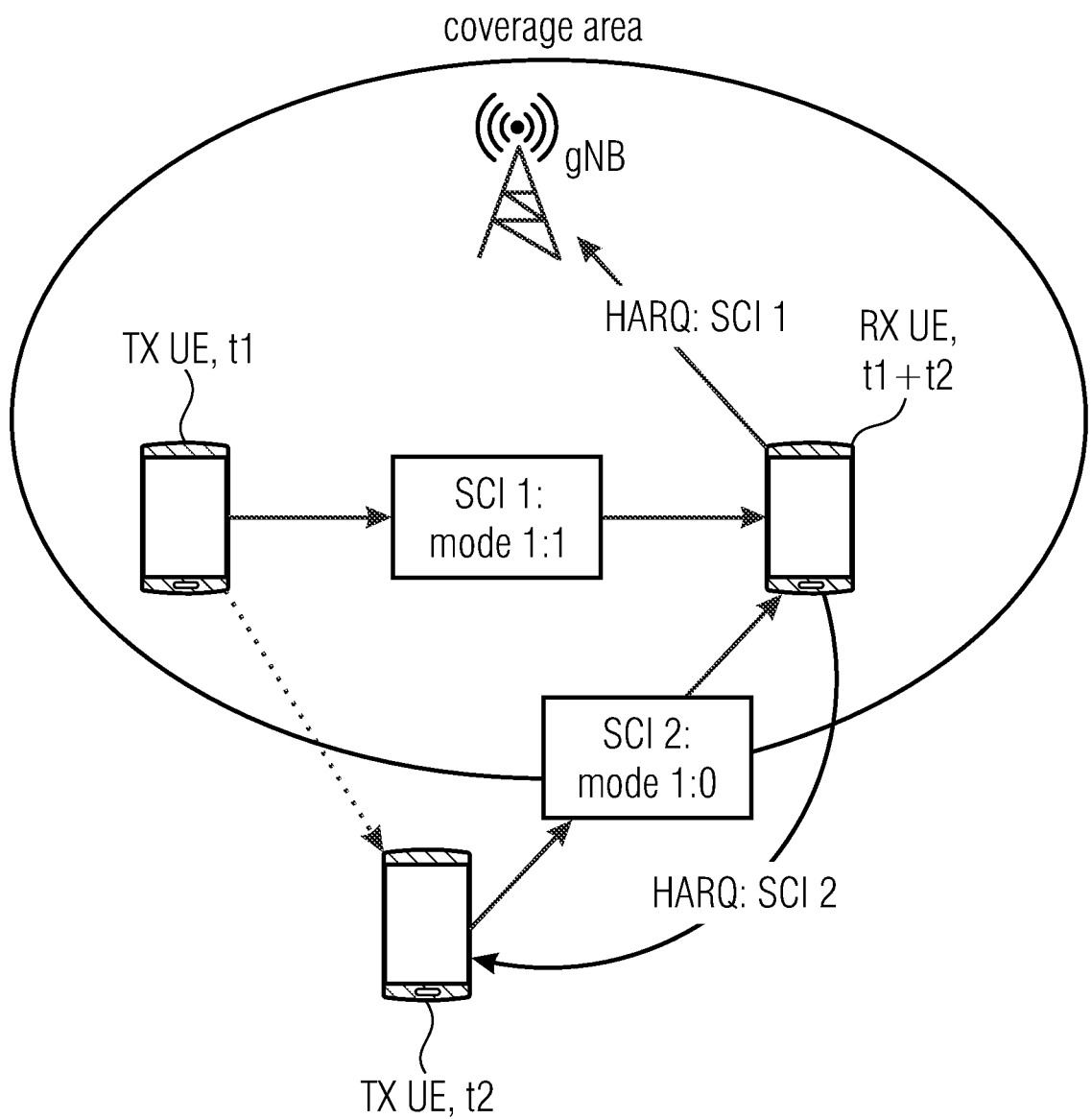
FIG. 9 illustrates an example for a deactivation of HARQ-ACK reporting to the gNB by a receiving UE in case the transmitting UE gets out-of-coverage of the gNB.

FIG. 9 illustrates an example for a deactivation of HARQ-ACK reporting to the gNB by a receiving, RX, UE in case the transmitting, TX, UE gets out-of-coverage of the gNB, e.g., by moving out of the coverage area of the gNB, while the RX UE remains in-coverage. Initially, at time t1, the TX UE is in-coverage and operates in Mode 1 as indicated by SCI 1. The RX UE reports a feedback to the gNB. At time t2, the TX UE is out-of-coverage and now signals to the RX UE to operate in Mode 2. Responsive to this signaling, the RX UE stops reporting the feedback to the gNB and reports the feedback via the SL to the RX TX.

For example, for RRC enabling and disabling of SL HARQ reporting the following RRC PUCCH-Config information element may be employed:

```
PUCCH-Config ::= SEQUENCE {
...
```

```
  sl-HARQ-ACK-reporting              BOOLEAN
  ...
}
```

For example, for a source-specific reporting (UE reports only for explicitly indicated SL source IDs) the following RRC PUCCH-Config information element may be employed:

```
PUCCH-Config ::= SEQUENCE {
...
  sl-HARQ-ACK-reporting              SEQUENCE
                                     (SIZE (1..n)) OF SL-SOURCE-ID
  ...
}
```

Retransmissions on Exceptional Pool

In accordance with embodiments, an exceptional pool may be preconfigured with the source and the destination UEs, and in case that one of the UEs gets out-of-coverage, it will transmit on the exceptional pool, which makes the other UE aware to use Mode 2 HARQ procedure.

Sidelink Assignment Index (SAI) on Sidelink

In accordance with embodiments, to ensure the receiver UE detects missed transmissions, the transmitter UE conveys a SAI counter in the SCI. The counter is increased with each transmission to the same UE. In the first transmission the SAI is set to 0. The HARQ-ACK feedback for missed transmissions is set to NACK.

Figure 10:
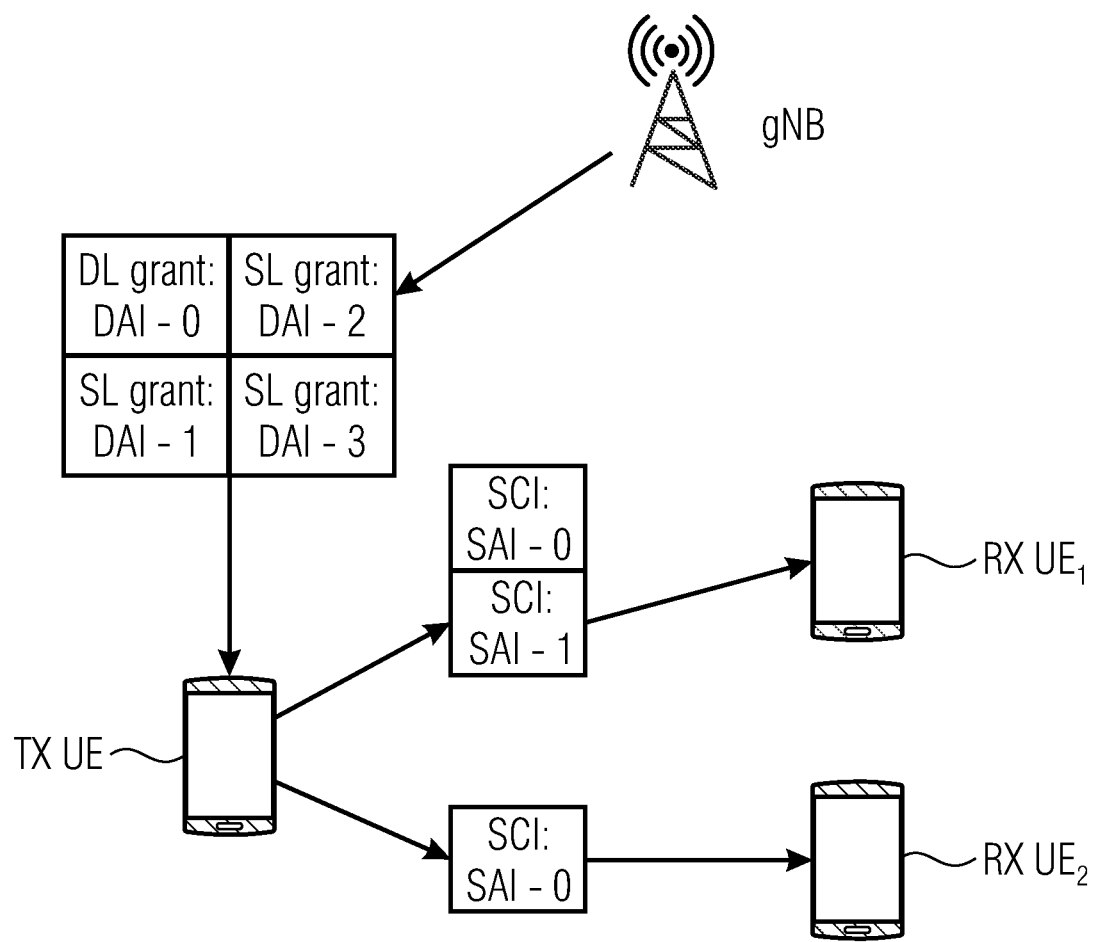
FIG. 10 illustrates an example of using a Sidelink Assignment Index (SAI)

FIG. 10 illustrates an example of using the Sidelink Assignment Index. The gNB includes into the respective DL and SL grants (as is known in the art) the DAIs so as to allow the TX UE to detect any missed DL transmissions. The TX UE is for communicating with RX $UE_1$ and RX UEs and includes into the respective sidelink transmissions the SAI to all the RX UEs to detect any missed SL transmissions. The RX $UE_1$ receives two transmissions so that the initial value of the SAI is incremented from 0 to 1. The RX $UE_2$ receives a first transmissions so that the initial value of the SAI is set.

Feedback Bundling for Reporting to gNB (Assuming gNB is NOT Aware of Transmissions)

In accordance with embodiments, the receiver UE generates the HARQ-ACK feedback for several transmissions and bundles it for reporting to the gNB together with an identification of the transmitting UE. This enables a more efficient transmission on the Uu interface. The bundling may be activated or deactivated by gNB, by e.g. DCI or RRC signaling.

Periodic HARQ-ACK Report:

In accordance with embodiments, the UE is configured with a periodic PUCCH resource for transmitting a UCI indicating the ACKs and NACKs for transmissions. This HARQ-ACK Report may include one or more of the following:

```
list(<UE ID, integer>) - list of pairs
{UE ID, string of ACKs/NACKs to that UE ID}
list(<UE ID, integer>) - list of pairs
{UE ID, number of retransmissions related to that UE ID}
```

Feedback Bundling for Reporting to the gNB (Assuming gNB is Aware of Transmissions)

In accordance with embodiments, the receiver UE generates the HARQ-ACK feedback for several transmissions and bundles it for reporting to the gNB. This enables a more efficient transmission on the Uu interface. The bundling may be activated or deactivated by gNB, by e.g. DCI or RRC signaling.

Embodiments provide the following approaches to provide the HARQ-ACK feedback to the gNB.

SL Harq-ACK Pucch Periodicity:

The UE may be configured with a periodical PUCCH resource for HARQ-ACK reporting. Based on the periodicity, the number of transmissions and/or an additional configured size indicator, the UE transmits a number of bits representing HARQ-ACK feedback for all received/potentially received transmissions of a preconfigured time window.

Separate or Common HARQ-ACK Codebook:

A HARQ-ACK codebook may be constructed and transmitted separately from the Uu HARQ-ACK codebook or multiplexed into it, as described above in the section "HARQ-ACK codebooks". Since the gNB is aware of all the transmissions it may associate the individual HARQ-ACK bits to the corresponding transmissions based on the order.

HARQ-ACK Feedback Bundling for Reporting in S1 Interface

As described above, transmitting the HARQ-ACK feedback on the SL one by one may degrade the spectral efficiency. Hence, embodiments of the present invention provide bundling the feedback. The bundling in the SL interface may be applied to Mode 2 HARQ-ACK reporting but also to the reporting in SL for Mode 1 HARQ procedure, if the transmitter/source UE is providing the HARQ-ACK feedback to the gNB.

Feedback Request Indicator Triggered by Source/Transmitter UE SAI on Sidelink

In accordance with embodiments, to ensure the receiver UE detects missed transmissions, the transmitter UE conveys a SAI counter in the SCI, as has been described above with reference to FIG. 10. The counter is increased with each transmission to the same UE. In the first transmission the SAI is set to 0. The HARQ-ACK feedback for missed transmissions is set to NACK.

Feedback Request Indicator in SCI

In accordance with embodiments, the transmitter UE conveys a feedback request indicator field (HR) in the SCI. This field is set to 0 to indicate that the receiver UE should continue bundling the HARQ-ACK feedback. If this field is set to 1, a part of the associated data resource is reserved for the receiver UE to transmit its bundled feedback in this resource. The size of this resource may be fixed or indicated by a separate field in the SCI. With help of the SAI field of the received transmissions the receiver UE fills up the missed transmissions with a NACK in the corresponding order and reports the bundled feedback. This way it is ensured that the receiver UE and transmitter UE are aligned on the number of bits expected for feedback (during a minimum processing time).

In case that the minimum processing time is not met for the reporting because the last transmission was timely to close to the feedback request, the UE may report a NACK for that transmission.

Figure 11:
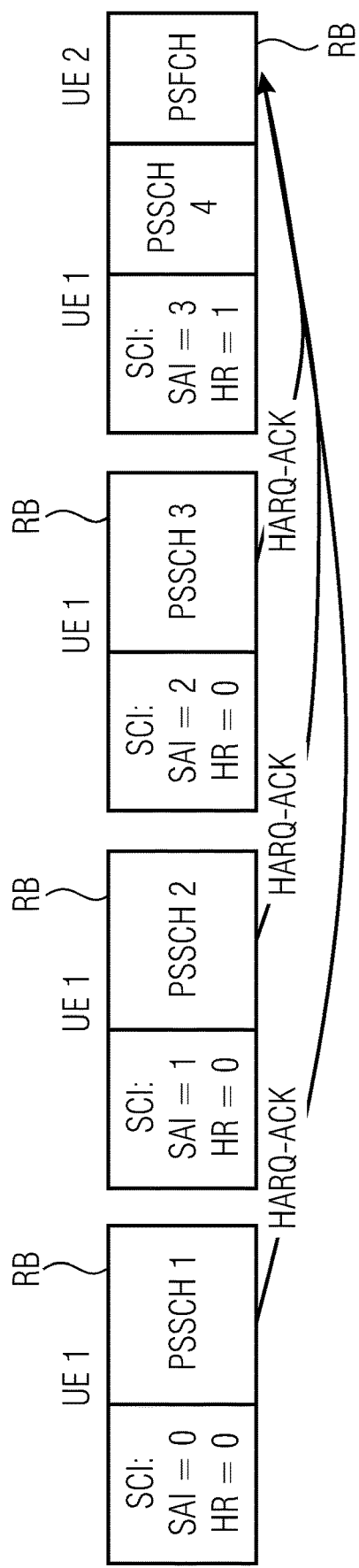
FIG. 11 illustrates an example using the feedback request indicator field (HR) in the SCI.

FIG. 11 illustrates an example using the feedback request indicator field (HR) in the SCI. It is assumed that it is desired that the RX UE 1 bundles the feedback for three transmissions so that initially, in the first (leftmost) resource block (RB) the HR field in the SCI allocating the PSSCH 1 is set to "0" so that the RX $UE_1$ will not transmit the feedback for the data transmission. The feedback may be buffered. Likewise, the HR field in the second and third SCIs allocating the PSSCH 2 and the PSSCH 3 is set to "0" so that the RX $UE_1$ will also buffer the feedback for the respective data transmissions. In the fourth SCI allocating the PSSCH 4 the HE field is set to "1", and the data region is shared between the PDCCH4 and the PSFCH. Responsive the this, the RX UE will transmit the buffered feedback in the PSFCH over the sidelink to the RX UE. As is indicated in FIG. 11, each SCI may also include the SAI so that the RX UE may determine whether any transmissions were missed. It is noted that the position of the PSFCH is not fixed, it may be located anywhere within the resource block RB excluding the control region in which the SCI is provided.

HARQ-Timing-Indicator Provided by Source/Transmitter UE

In accordance with embodiments, the transmitter UE conveys a HARQ-timing indicator field (HTI) in SCI, which indicates on its own or in combination with a RRC configured K1 value, the resource where to report the HARQ-ACK feedback, which fulfils the processing timeline. This timing indication may be absolute in terms of a number of slots or relative in terms of a number of transmissions/packets. In the corresponding resource the transmitter UE reserves a part or the whole resource for the feedback transmission of the receiver UE.

Figure 12:
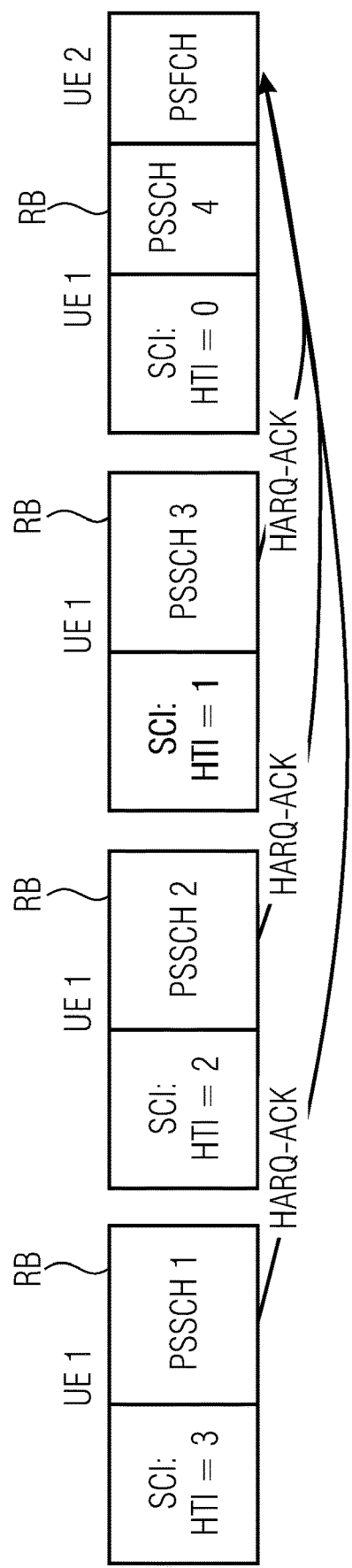
FIG. 12 illustrates an example using the HARQ-timing indicator field in the SCI as a timer.
Figure 13A:
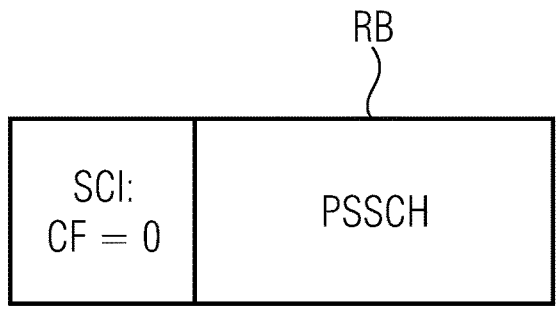
FIG. 13 illustrates an example of a RX UE reserving a smaller or larger part of the data region for the control data including the HARQ-ACK feedback and/or additional control information responsive to CF being set in the SCI to a certain value.
Figure 13B:
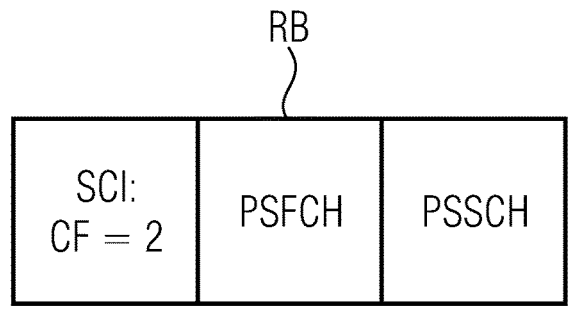
Figure 13C:
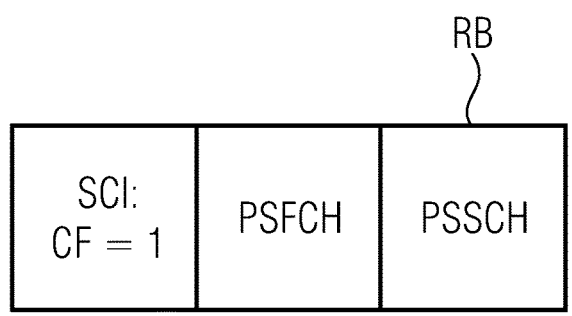
Figure 13D:
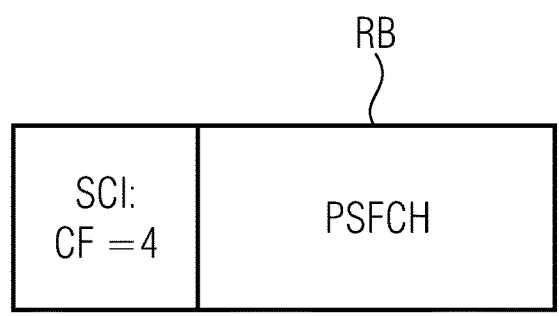

FIG. 12 illustrates an example using the HARQ-timing indicator field in the SCI as a timer. It is assumed that it is desired that the RX UE 1 bundles the feedback for three transmissions so that initially, in the first (leftmost) resource block (RB) the HTI field in the SCI allocating the PSSCH 1 is set to "3" so that the RX $UE_1$ will not transmit the feedback for the data transmission. The feedback may be buffered. The HTI field in the second and third SCIs allocating the PSSCH 2 and the PSSCH 3 is set to "2" and "1", respectively, so that the RX $UE_1$ will also buffer the feedback for the respective data transmissions. In the fourth SCI allocating the PSSCH 4 the HTI field is set to "0", and the data region is shared between the PDCCH4 and the PSFCH. Responsive the this, the RX UE will transmit the buffered feedback in the PSFCH over the sidelink to the RX UE. Although not indicated in FIG. 12, each SCI may also include the SAI so that the RX UE may determine whether any transmissions were missed. Additionally, also the HTI may be used for detecting missed transmissions. In this case, the UE reports a NACK for each HTI value which has not been received. It is noted that the position of the PSFCH is not fixed, it may be located anywhere within the resource block RB excluding the control region in which the SCI is provided.

For example, a HTI may be based on absolute units, e.g. slots, and for signaling the HTI the following RRC PUCCH-Config information element may be employed:

```
PSFCH-Config ::= SEQUENCE {
    ...
    sl-DataToSL-ACK                SEQUENCE
    (SIZE (1..8)) OF INTEGER (0..15)
    ...
}
```

The sl-DataToSL-ACK values may point to the resource which is planned to be used for the PSFCH transmission (see FIG. 12).

Early Report Request

In accordance with embodiments, an early report may be desired, e.g., in case the transmitter UE does not have more packets to transmit and thus wants to receive the HARQ-ACK feedback immediately. In this case the TX UE may transmit a SCI with the HARQ-ACK timing indicator set to 0. This overwrites the previous HARQ-ACK timing indicators and the receiver UE reports all previous HARQ-ACK feedback in the associated resource.

Periodic PSFCH Configured by the gNB

In accordance with embodiments, the gNB configures the source and the destination UEs with a periodic PSFCH allocation, in a SPS-like manner. In this slot the source UE uses only a subset of the data region and expects the destination UE's feedback in parts of the remaining data region (see FIG. 12).

Asynchronous HARQ Reporting Triggered by Destination/Receiver UE

In accordance with embodiments, the receiver UE is configured implicitly or by the gNB to report over a window of slots/transmissions to a TX UE. The window may be defined by:

Window size in transmissions
Windows size in number of HARQ-ACK bits
Window size in slots
Window size given by a set of K1 values (indicating the time between PSSCH and HARQ-ACK)

Other than in the preceding embodiments, in this embodiment the destination/receiver UE transmits the HARQ-ACK feedback in its own transmission. The RX UE conveys a field in its SCI indicating the associated control data in its data region. This may be realized by a Control Factor (CF) which indicates the ratio of control and data. The RX UE may reserve a smaller or larger part of the data region for control data including the HARQ-ACK feedback and/or additional control information, e.g. measurement reports, CQI, etc.

FIG. 13 illustrates an example of a RX UE reserving a smaller or larger part of the data region for the control data including the HARQ-ACK feedback and/or additional control information responsive to CF being set in the SCI to a certain value. As is shown in FIG. 13(a), when CF is set to "0" no part of the data region is reserved for the control data. As is shown in FIG. 13(b), when CF is set to "1" a larger part (PSFCH) of the data region is reserved for the control data. As is shown in FIG. 13(c), when CF is set to "2" a smaller part (PSFCH) of the data region is reserved for the control data. As is shown in FIG. 13(d), when CF is set to "4" the entire the data region is reserved for the control data. It is noted that the position of the PSFCH is not fixed, it may be located anywhere within the resource block RB excluding the control region in which the SCI is provided.

The reporting may be triggered either by the receiver UE itself or by the transmitter UE, as discussed in the following section.

Triggering by Transmitter UE

In accordance with embodiments, the transmitter UE conveys a field in its SCI to request a HARQ-ACK reporting from the receiver UE. If the receiver UE decodes this field, it bundles all the buffered feedback related to the transmitter UE and transmits it in a next transmission either multiplexed with data or not. The field in the SCI triggering the feedback transmission may also be the aforementioned HR or HTI.

Enhancements for SL Groupcast HARQ
HARQ-ACK Reporting on Common Resource
UE-Specific NACK Sequence In accordance with embodiments, to avoid a destructive channel sum effect each reporting UE uses a UE-specific sequence, e.g. a different cyclic shift on the same sequence, to signal a NACK on the common HARQ resource. This sequence (or parameters for the sequence generation) may either be configured during group setup or derived implicitly from, e.g., a member ID of a UE.

Figure 14B:
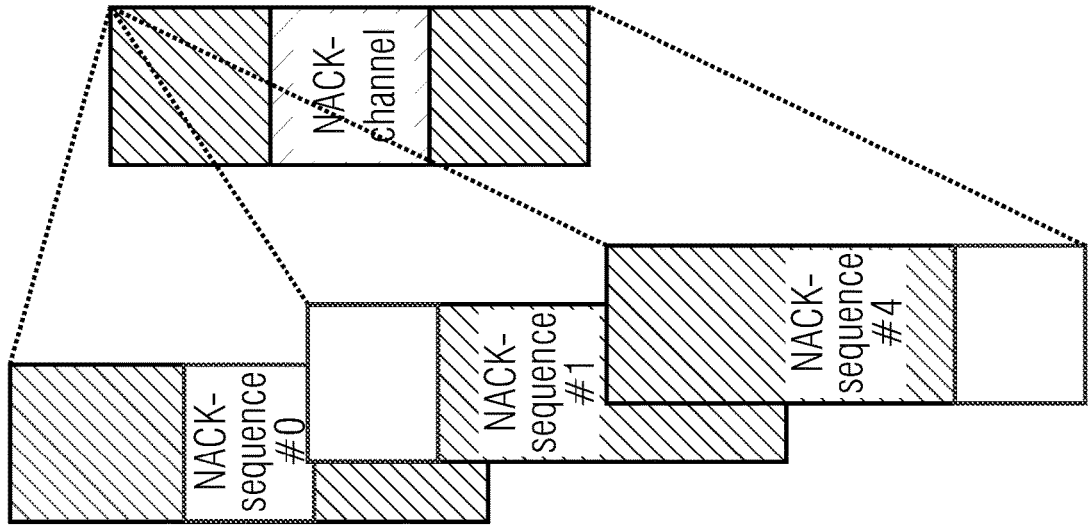
FIG. 14 illustrates examples for using UE-specific sequences to transmit a NACK on a common NACK channel
Figure 14A:
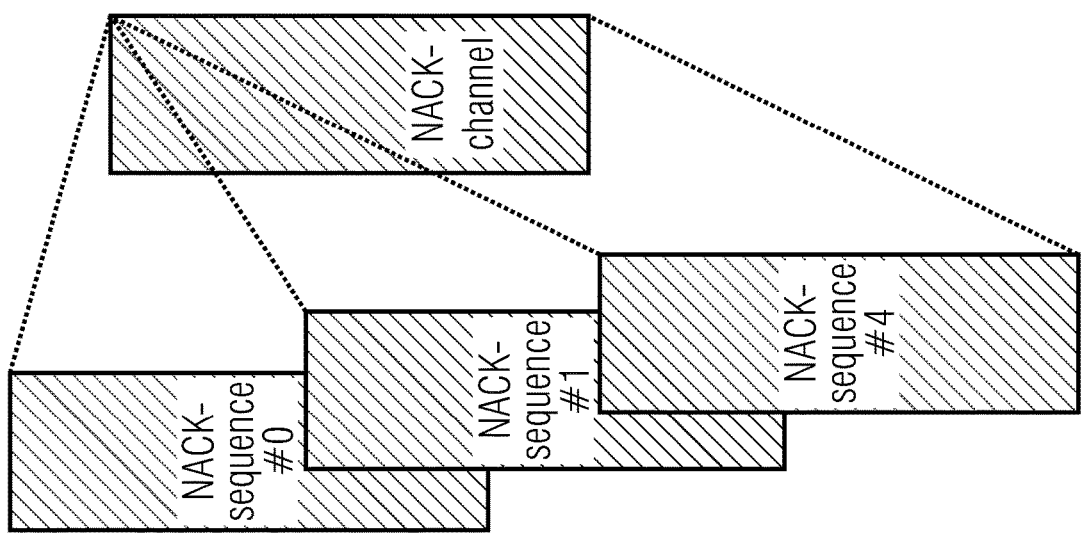

FIG. 14 illustrates examples for using UE-specific sequences to transmit a NACK on a common NACK channel. FIG. 14(a) illustrates an example of UE-specific sequences for three RX UEs in a group using the UE-specific sequences #0, #1 and #4, respectively. The UE-specific sequences are different from each other and each extends or spans over the common NACK channel. FIG. 14(a) illustrates an example of UE-specific sequences for three RX UEs in a group using, again, the UE-specific sequences #0, #1 and #4, respectively. Other than in FIG. 14(a) the different UE-specific do not extend or span over the common NACK channel. Rather, the sequences may be such that they do not overlap or overlap only partially in the NACK channel.

ACK/SCI-Confirmation Channel

NACK-based reporting may involve distinguishing the all ACK case from the SCI missed case. To address this, embodiments of the present invention propose introducing an ACK or SCI-confirmation channel. This is a channel with different resources from the NACK channel or using different (e.g., orthogonal sequences) from the NACK channel.

Figure 15:
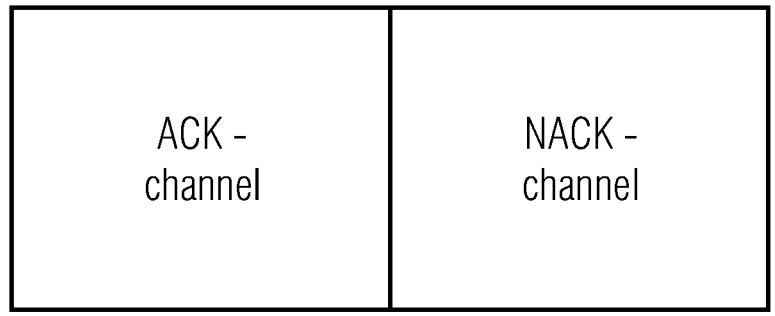
FIG. 15 illustrates examples of the ACK and NACK channels.

FIG. 15 illustrates examples of the ACK and NACK channels which may be FDMed, TDMed or CDMed. Furthermore, the NACK channel may occupy more resources than the ACK-channel to make it more robust.

ACK Channel

In accordance with embodiments, each UE transmits in the ACK channel if the transmission is decoded successfully, otherwise it transmits in the NACK channel.

SCI-Confirmation Channel

In accordance with embodiments, each UE transmits in the SCI-confirmation channel independent of the decoding outcome. If the transmission is not decoded, the UE transmits additionally in the NACK channel.

Figure 16:
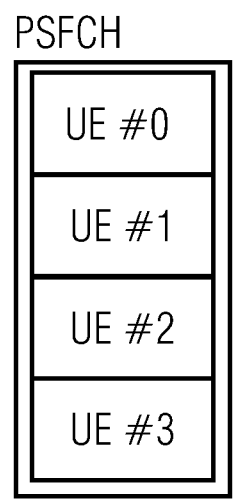
FIG. 16 illustrates an example of a HARQ-ACK channel split into subresources each used by a single receiver UE.
Figure 17A:
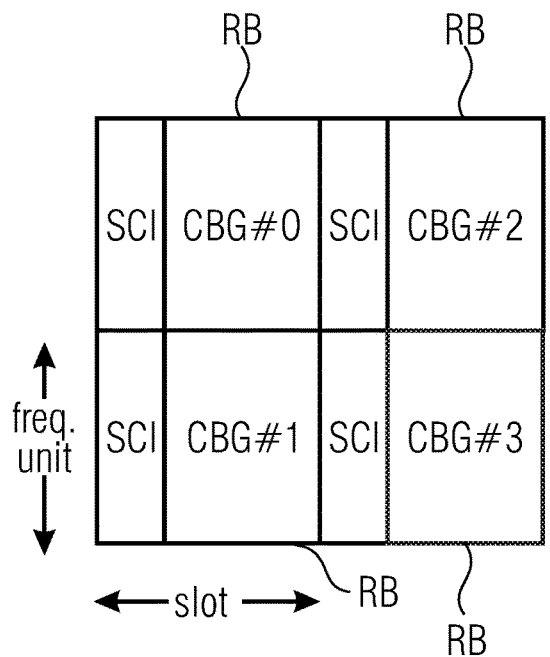
FIG. 17 illustrates examples for scheduling one transport block (TB) over multiple resource blocks (RBs)
Figure 17B:
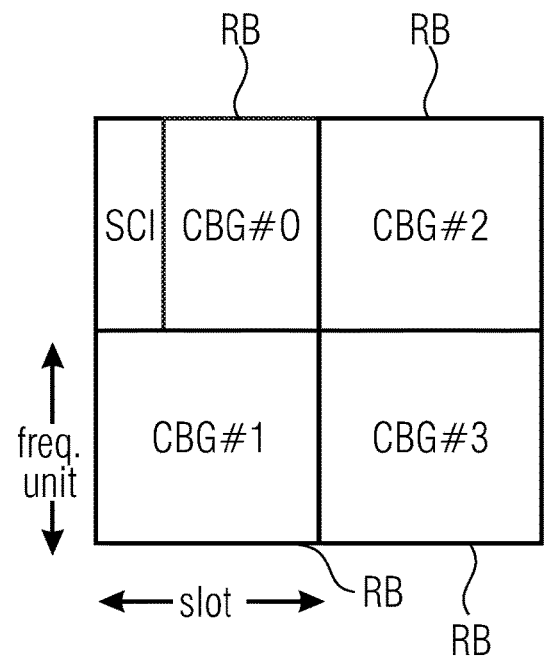
Figure 17C:
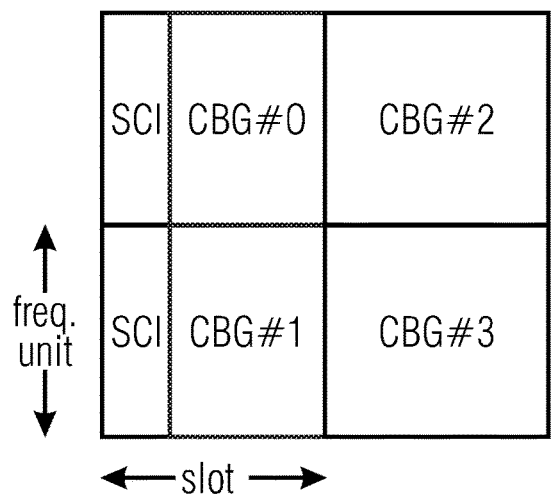
Figure 17D:
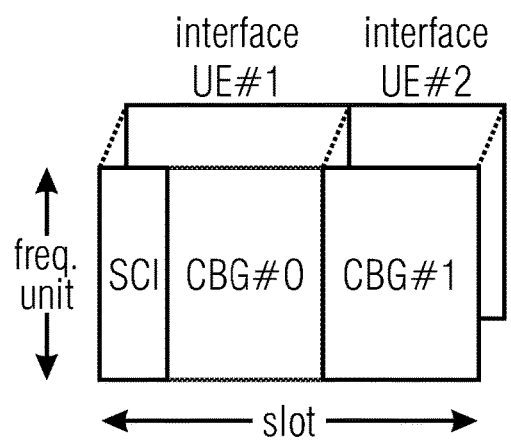

HARQ-ACK Reporting on Separate Resources
Implicit Subresource HARQ-ACK Reporting In accordance with embodiments, the HARQ-ACK channel is split into subresources each used by a single receiver UE, as is illustrated in FIG. 16. Based on the UE ID and the group (e.g., maximum) size the UE derives its own subresource where it transmits its ACK/NACK feedback. The number of subresources is either determined dynamically based on the actual group size or by the maximum group size which is configured or fixed by specification. If the maximum group size is larger than the actual group size, some of the subresources stay unused till a new group member joins the group.

The UE ID may be assigned
based on an order that UEs join the group, and/or
by a group leader during group setup, and/or
by the transmitter which defines the order during connection setup.

CBG Transmission
Sidelink Transmission Over Multiple Slots/Frequency Resources

To enable transmission of large data packets, embodiments of the present invention propose scheduling one transport block (TB) over multiple resource blocks (RBs), e.g. multiple slots and/or frequency resources in the SL. This may be achieved by introducing a new SCI format indicating an allocation over multiple resources or using several SCIs each indicating its associated resource, as depicted in the right and left, respectively.

Structure of CBGs

In the SL there may exist uniform resource blocks (RBs) which include a control region carrying a single SCI, a data region carrying the Physical Sidelink Shared Channel (PSSCH) and optionally a feedback region carrying the Physical Sidelink Feedback Channel (PSFCH) (see FIG. 11, FIG. 12 and FIG. 13 and the associated description above). Usually one resource block is assigned to a single UE. Hence, the interference may be assumed equally strong over the whole resource block. In the case that there is a PSFCH used by another UE, the interference behavior may be different between PSCCH+PSSCH and PSFCH. The introduction of code block groups CBGs in NR allows to cope with the problem that the interference is unequal over the whole transmission. A single CBG may be mapped to a region which has uniform interference behavior.

FIG. 17 illustrates examples for scheduling one transport block (TB) over multiple resource blocks (RBs). FIG. 17(a) illustrates that each CBG or RB may be associated with a separate SCI. FIG. 17(b) illustrates that a plurality of CBGs may be associated with a common SCI. FIG. 17(c) illustrates that a plurality of SCIs may be used, each associated with a plurality of CBGs. FIG. 17(d) illustrates an example in which a CBG or RB equals to a data resource, which may be split into CBG #0 and CBG #1 to be used as PSSCH and PSFCH by other UEs (see FIG. 11, FIG. 12 and FIG. 13 and the associated description above). For example, in case there is a resource block structure having two parts used by different UEs, e.g. PSCCH+PSSCH (UE$_1$) and PSFCH (UE$_2$), which may collide/interfere with the CBG transmission, it may be beneficial to split the CBGs based on that split, nevertheless, both CBGs carry data so they are both in the PSSCH. In other words, as illustrated in FIG. 17(d), for the case, that the whole resource block is occupied by a single UE the CBG may be mapped to the data region of the resource block (PSSCH). If PSFCH by a different UE is supported and the current transmission does not include a PSFCH, two CBGs may be mapped to the data region of the current CBG transmission. The first CBG equaling the data region of the resource block structure including a PSFCH and the second CBG equaling the feedback region of the said resource block structure.

Embodiments may provide:
a new SCI format with location field for multiple resource blocks
a new SCI format with TB indicator/CBGTI For example, a DCI format for per CBG SCI may include one or more of:
a source UE ID
a destination UE ID
a MCS (optional)
a HARQ Process Number (optional)
a new data indicator, NDI (optional)
a (maximum) Number of CBGs (optional, might be preconfigured by RRC)
a CBGTI-bit mask indicating the CBG/CBGs which is/are transmitted in the data region belonging to this SCI For example, a SCI format for per TB SCI may include one or more of:
a source UE ID
a destination UE ID
a frequency resource allocation
a time domain allocation
a MCS (optional)
a HARQ Process Number (optional)
a NDI (optional)
a CBGTI—bit mask indicating the actually transmitted CBGs

CBG SL SAI

In accordance with embodiments, a SAI in the SCI is increased by one per CBG. This ensures that even if the UE misses the whole CBG transmission, it knows how many HARQ-ACK bits to transmit.

CBGTI in SL SCI

In accordance with embodiments, if several SCIs are used for scheduling the CBG transmission, a CBG Transmission Indicator (CBGTI) field may be used to indicate which CBGs are transmitted in the current transmission. The CBGTI may include one or more of the following:
the number of transmitted CBGs
an indication of a CBG transmission, if the number is fixed by RRC signaling
a bit string of length CBG_max indicating the actually transmitted CBGs CBG HARQ-ACK Subcodebook In accordance with embodiments, if the number of CBGs is fixed per transmission, e.g. RRC configured, or indicated in the SCI, then the UE generates a HARQ-ACK subcodebook which includes X bits, where X is the number of actually transmitted CBGs or the maximum number of CBGs. Each HARQ-ACK bit corresponds to the feedback of one associated subtransmission.

In case of HARQ-ACK codebooks indicating only the number of resources, each CBG is treated as a separate resource. Hence, retransmitting two CBGs of a four CBG transmission would result in an indication of two retransmission resources that may be used.

Link Information Message (Mode 2)

Reporting of Periodic or Predictable Transmissions

In out-of-coverage scenarios, the half-duplex constraint poses a severe limitation. Embodiments of the present invention propose a signaling conveyed via SL, e.g. using SL RRC, or by the gNB to the potential source UEs, e.g. using RRC, to inform the them about periodic transmissions of the potential destination UE which in turn may be avoided by them when transmitting to the said destination UE.

The reporting may be provided as:
a list of tx slots—sparse vector representation
a bit mask indicating tx slots—dense vector representation
a list of tx resources (frequency, slot)—sparse matrix representation
a bit mask indicating tx resources—dense matrix representation Reporting of Sensing Report In accordance with embodiments, the destination UE forwards its sensing report to the source UE, such that the source UE is aware of potentially interfered resources.

The reporting may be provided as:
a list of potentially polluted resources (frequency, slot)— sparse matrix representation
a bit mask indicating resources to be avoided—dense matrix representation General Embodiments of the present invention have been described in detail above, and the respective embodiments and aspects may be implemented individually or two or more of the embodiments may be implemented in combination.

In some of the embodiments described above, reference has been made to respective vehicles being either in a mode in which SL resource allocation configuration or assistance is provided by a base station, e.g., the connected mode, also referred to as mode 1 or mode 3 configuration, or vehicles being in a mode in which when no SL resource allocation configuration or assistance is provided by a base station, e.g., the idle mode, also referred to as mode 2 or mode 4 configuration. However, the present invention is not limited to V2V communications or V2X communications, rather it is also applicable to any device-to-device communications, for example non-vehicular mobile users or stationary users that perform a sidelink communication, e.g., over the PC5 interface. Also, in such scenarios, the inventive aspects described above may be employed.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 18:
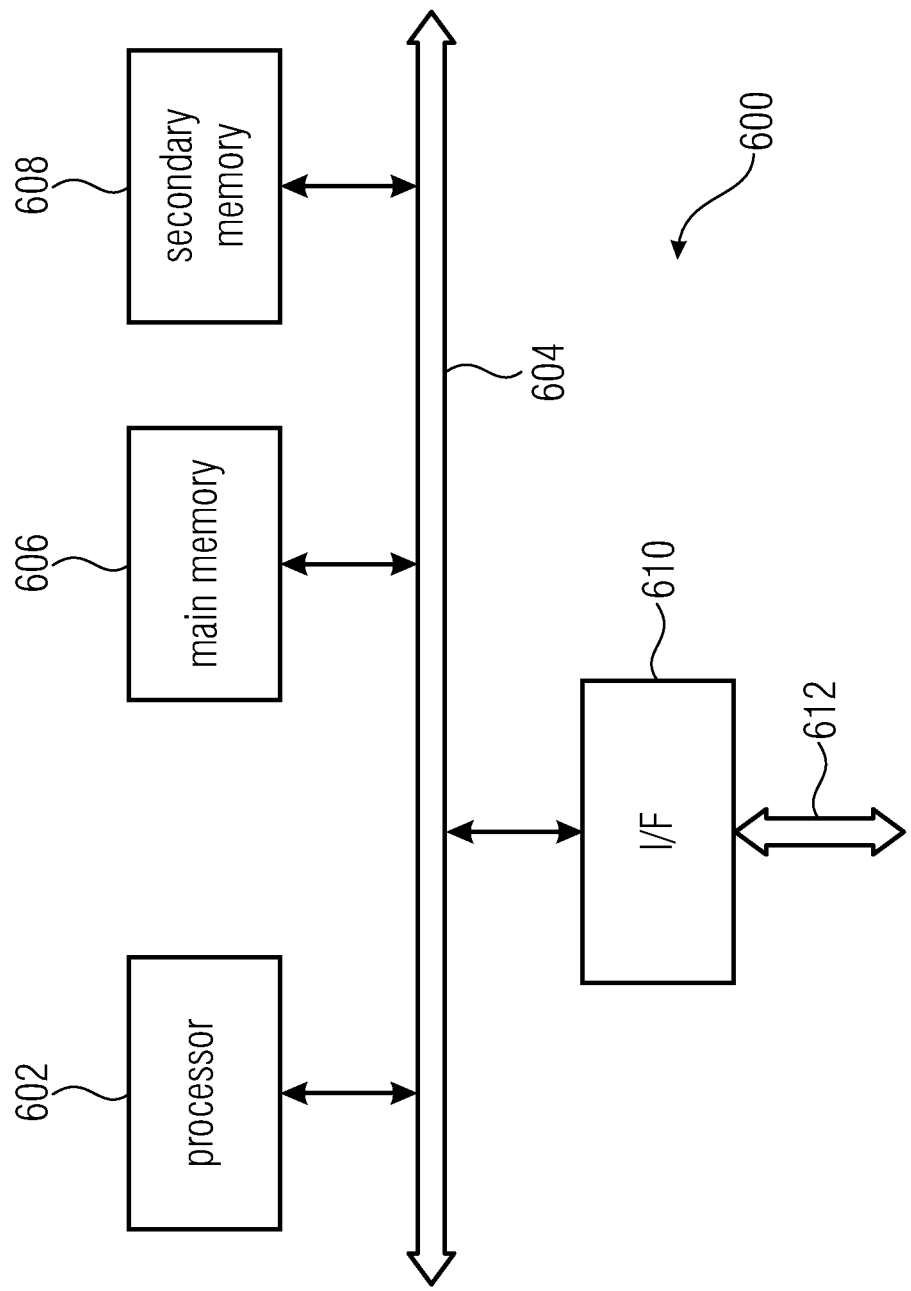
FIG. 18 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 18 illustrates an example of a computer system 600. The units or modules as well as the steps of the methods performed by these units may execute on one or more computer systems 600. The computer system 600 includes one or more processors 602, like a special purpose or a general purpose digital signal processor. The processor 602 is connected to a communication infrastructure 604, like a bus or a network. The computer system 600 includes a main memory 606, e.g., a random-access memory (RAM), and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
STTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A device comprising:
a processor circuit and a memory circuit, wherein the memory is arranged to store instructions for the processor circuit,
wherein the processor circuit is arranged to communicate using a portion of a plurality sidelink resources,
wherein the processor circuit is arranged to receive a sidelink feedback from a receiving device,
wherein the sidelink feedback indicates a successful or non-successful reception by the receiving device,
wherein the processor circuit is arranged to report the sidelink feedback to a third device,
wherein the third device is arranged to provide to sidelink resources for a possible retransmission of a data packet in response to the sidelink feedback,
wherein the processor circuit is arranged to reporting the sidelink feedback is activated or deactivated in response to at least one conditions,
wherein the processor circuit is arranged to deactivate the sidelink feedback reporting in response to a deactivation signal from the third device,
wherein the processor circuit is arranged to switch to an out-of-coverage sidelink feedback procedure in response to the deactivation signal from the third device.

2. The device claim 1, wherein the at least one conditions are selected from the group consisting of a goal of reducing physical uplink control channel utilization for the sidelink feedback, a goal of reducing reporting overhead, an out-of-coverage timer/trigger, a quality of service, reliability and/or latency requirement, a trigger by an application, a change in link quality, a change of interference level, and reaching or exceeding a packet loss threshold.

3. The device claim 1,
wherein the processor circuit is arranged to select sidelink resources for the possible retransmission in accordance with an out-of-coverage sidelink feedback procedure in response to the deactivation signal from the third device using third device assistance,
wherein the third device assistance is selected from the group consisting of providing resources from a pool/mini resource pool and providing grant-free resources.

4. The device of claim 1, wherein the sidelink communication comprises:
a unicast transmission from the processor circuit,
a multicast transmission from the processor circuit to a plurality of receiving devices,
a groupcast from the processor circuit to a plurality of receiving devices,
a broadcast transmission by the processor circuit.

5. The device of claim 1, wherein a retransmission is selected from the group consisting of transmitting the data packet itself, transmitting one or more duplicates of the data packet, transmitting one or more redundancy versions of the data packet, and transmitting one or more erasure correction codes for the data packet.

6. The device of claim 5, wherein the one or more redundancy versions provide for an incremental redundancy at the receiver device.

7. The device of claim 1,
wherein the sidelink resources comprise a first group of resources and a second group of resources,
wherein the first group of resources comprises a first numerology,
wherein the second group of resources comprises a second numerology,
wherein the first numerology is different from the second numerology.

8. The device of claim 1, wherein the set of sidelink resources comprises a plurality of contiguous or non contiguous resources across a frequency domain and adjacent or non-adjacent across a time domain.

9. The device of claim 1, wherein the set of sidelink resources defines at least one of a resource pool, a mini-resource pool, a band width part in a resource pool and a resource pool in a band width part.

10. A device comprising:
a processor circuit and a memory circuit, wherein the memory is arranged to store instructions for the processor circuit,
wherein the processor circuit is arranged to communicate using a portion of a plurality of sidelink resources,
wherein the processor circuit is arranged to provide sidelink resources for a possible retransmission of a data packet over the sidelink to a receiving device in response to the sidelink feedback, wherein the processor circuit is arranged to deactivate the sidelink feedback reporting in response to a deactivation signal from the third device, wherein the processor circuit is arranged to switch to an out-of-coverage sidelink feedback procedure in response to the deactivation signal from the third device.

11. A device comprising:
a processor circuit and a memory circuit, wherein the memory is arranged to store instructions for the processor circuit,
wherein the processor circuit is arranged to communicate using a portion of a plurality of sidelink resources,
wherein the processor circuit is arranged to receive a sidelink feedback from a receiving device for a plurality of data transmissions,
wherein the sidelink feedback indicates a successful or non-successful reception by the receiving device,
wherein the processor circuit is arranged to bundle a plurality of sidelink feedbacks,
wherein the bundle is reported to a third device,
wherein the processor is arranged to provide a slot timing value,
wherein the slot timing value indicates the number of slots before the sidelink feedback is reported in physical uplink control channel,
wherein the slot timing value is sent on a physical shared sidelink channel.

12. A device comprising:
a processor circuit and a memory circuit, wherein the memory is arranged to store instructions for the processor circuit,
wherein the processor circuit is arranged to communicate using a portion of a plurality sidelink resources,
wherein the processor circuit is arranged to receive a sidelink feedback from a receiving device,
wherein the sidelink feedback indicates a successful or non-successful reception by the receiving device,
wherein the processor circuit is arranged to report the sidelink feedback to a third device,
wherein the third device is arranged to provide to sidelink resources for a possible retransmission of a data packet in response to the sidelink feedback,
wherein the processor circuit is arranged to reporting the sidelink feedback is activated or deactivated in response to at least one conditions,
wherein the processor circuit is arranged to select sidelink resources for the possible retransmission in accordance with an out-of-coverage sidelink feedback procedure in response to the deactivation signal from the third device using third device assistance,
wherein the third device assistance is selected from the group consisting of providing resources from a pool/mini resource pool and providing grant-free resources.

13. The device claim 12, wherein the at least one conditions are selected from the group consisting of a goal of reducing physical uplink control channel utilization for the sidelink feedback, a goal of reducing reporting overhead, an out-of-coverage timer/trigger, a quality of service, reliability and/or latency requirement, a trigger by an application, a change in link quality, a change of interference level, and reaching or exceeding a packet loss threshold.

14. The device of claim 12, wherein the sidelink communication comprises:
a unicast transmission from the processor circuit,
a multicast transmission from the processor circuit to a plurality of receiving devices,
a groupcast from the processor circuit to a plurality of receiving devices,
a broadcast transmission by the processor circuit.

15. The device of claim 12, wherein a retransmission is selected from the group consisting of transmitting the data packet itself, transmitting one or more duplicates of the data packet, transmitting one or more redundancy versions of the data packet, and transmitting one or more erasure correction codes for the data packet.

16. The device of claim 15, wherein the one or more redundancy versions provide for an incremental redundancy at the receiver device.

17. The device of claim 12,
wherein the sidelink resources comprise a first group of resources and a second group of resources,
wherein the first group of resources comprises a first numerology,
wherein the second group of resources comprises a second numerology,
wherein the first numerology is different from the second numerology.

18. The device of claim 12, wherein the set of sidelink resources comprises a plurality of contiguous or non contiguous resources across a frequency domain and adjacent or non-adjacent across a time domain.

19. The device of claim 12, wherein the set of sidelink resources defines at least one of a resource pool, a mini-resource pool, a band width part in a resource pool and a resource pool in a band width part.

* * * * *